United States Patent
Naganuma

(10) Patent No.: US 11,799,551 B2
(45) Date of Patent: Oct. 24, 2023

(54) OPTICAL TRANSMISSION AND RECEPTION SYSTEM, OPTICAL TRANSMITTER, AND OPTICAL RECEIVER

(71) Applicant: Fujitsu Limited, Kawasaki (JP)

(72) Inventor: Tomohiro Naganuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 17/945,735

(22) Filed: Sep. 15, 2022

(65) Prior Publication Data

US 2023/0198621 A1 Jun. 22, 2023

(30) Foreign Application Priority Data

Dec. 22, 2021 (JP) ................. 2021-207957

(51) Int. Cl.
- *H04B 10/2575* (2013.01)
- *H04B 10/2513* (2013.01)

(52) U.S. Cl.
CPC . *H04B 10/25759* (2013.01); *H04B 10/25133* (2013.01)

(58) Field of Classification Search
CPC ............ H04B 10/25759; H04B 10/25133
See application file for complete search history.

(56) References Cited

U.S. PATENT DOCUMENTS

| | | | |
|---|---|---|---|
| 9,438,350 B1 * | 9/2016 | Schmidt | H04B 10/50572 |
| 10,171,174 B1 * | 1/2019 | Pan | H04B 10/5161 |
| 2014/0314416 A1 * | 10/2014 | Vassilieva | H04B 10/506 |
| | | | 398/76 |
| 2016/0315712 A1 * | 10/2016 | Vassilieva | H04J 14/021 |
| 2016/0344481 A1 * | 11/2016 | Vassilieva | H04B 10/564 |
| 2023/0059003 A1 * | 2/2023 | Shimizu | H04B 10/2525 |
| 2023/0109405 A1 * | 4/2023 | Bakopoulos | H04B 7/0617 |
| | | | 398/115 |

FOREIGN PATENT DOCUMENTS

JP 2007-096513 A 4/2007

OTHER PUBLICATIONS

Fred Buchali et al., "CMOS DAC Supported 1.1 Tb/s/λ DWDM Transmission at 9.8 bit/s/Hz Over DCI Distances"; Journal of Lightwave Technology, vol. 39, No. 4, Feb. 15, 2021; 1171-1178; (8 pages).

(Continued)

*Primary Examiner* — Mina M Shalaby
(74) *Attorney, Agent, or Firm* — STAAS & HALSEY LLP

(57) ABSTRACT

An optical transmission and reception system includes an optical transmitter that converts an electrical data signal into an optical signal and transmits the optical signal; and an optical receiver that receives the optical signal input from the optical transmitter via an optical transmission line and converts the optical signal into the data signal. The optical transmitter includes a first compensator that compensates for a loss generated in the optical transmitter based on a first coefficient and a second coefficient, and the optical receiver includes a second compensator that compensates for a loss generated in the optical transmission line based on a third coefficient.

11 Claims, 27 Drawing Sheets

(56) References Cited

OTHER PUBLICATIONS

Saeed Fathololoumi et al., "1.6 Tbps Silicon Photonics Integrated Circuit and 800 Gbps Photonic Engine for Switch Co-Packaging Demostration"; Journal of Lightwave Technology, vol. 39, No. 4, Feb. 15, 2021; 11-1161; (7 pages).
Munehiko Nagatani et al., "A Beyond-1-Tb/s Coherent Optical Transmitter Front-End Based on 110-GHz-Bandwidth 2:1 Analog Multiplexer in 250-nm InP DHBT"; IEEE Journal of Solid State Circuits, vol. 55, No. 9, Sep. 2020; 2301-2315 (15 pages).
Yohei Sobu et al., "High-Speed Optical Digital-to-Analog Converter Operation of Compact Two-Segment All-Silicon Mach-Zehnder Modulator"; Journal of Lightwave Technology, vol. 39, No. 4, Feb. 15, 2021; 1148-1154 (7 pages).

\* cited by examiner

FIG. 1 1ST OPTICAL TRANSMISSION AND RECEPTION SYSTEM

FIG. 4

| FIRST TABLE ||||
|---|---|---|---|
| OPERATION MODE NUMBER | BAUD RATE | MODULATION SCHEME | FIRST COEFFICIENT |
| 1 | 64Gbaud | QPSK | ○○○○ |
| 2 | 96Gbaud | 16QAM | ×××× |
| 3 | 128Gbaud | 64QAM | △△△△ |

FIG. 13

| SECOND TABLE | | | |
|---|---|---|---|
| OPERATION MODE NUMBER | BAUD RATE | MODULATION SCHEME | THIRD COEFFICIENT |
| 1 | 64Gbaud | QPSK | ○○○○ |
| 2 | 96Gbaud | 16QAM | ×××× |
| 3 | 128Gbaud | 64QAM | △△△△ |

FIG. 23

| FIRST TABLE ||||| 
|---|---|---|---|---|
| OPERATION MODE NUMBER | BAUD RATE | MODULATION SCHEME | FIRST COEFFICIENT | SECOND COEFFICIENT |
| 1 | 64Gbaud | QPSK | ○○○○ | ○○○○ |
| 2 | 96Gbaud | 16QAM | ×××× | ×××× |
| 3 | 128Gbaud | 64QAM | △△△△ | △△△△ |

FIG. 26

| SECOND TABLE | | | | |
|---|---|---|---|---|
| OPERATION MODE NUMBER | BAUD RATE | MODULATION SCHEME | THIRD COEFFICIENT | FOURTH COEFFICIENT |
| 1 | 64Gbaud | QPSK | ○○○○ | ○○○○ |
| 2 | 96Gbaud | 16QAM | ×××× | ×××× |
| 3 | 128Gbaud | 64QAM | △△△△ | △△△△ |

OPTICAL TRANSMISSION AND RECEPTION SYSTEM, OPTICAL TRANSMITTER, AND OPTICAL RECEIVER

CROSS-REFERENCE TO RELATED APPLICATION

This application is based upon and claims the benefit of priority of the prior Japanese Patent Application No. 2021-207957 filed on Dec. 22, 2021, the entire contents of which are incorporated herein by reference.

FIELD

A certain aspect of the embodiments is related to an optical transmission and reception system, an optical transmitter, and an optical receiver.

BACKGROUND

In digital coherent optical communication, a DSP (Digital Signal Processor) is used to improve the transmission characteristics of optical signals by compensating for factors that deteriorate signal performance generated in an optical transmitter, an optical receiver, and an optical transmission line. The factors that deteriorate the signal performance include intersymbol interference due to band characteristics, skew, wavelength dispersion, and the like.

As a method to be used when performing the compensation, there is a method to cancel a performance deterioration factor by applying an inverse characteristic of the performance deterioration factor generated in the optical transmitter, optical receiver, or optical transmission line to the signal characteristic of a main signal, for example. For compensation of the intersymbol interference due to band characteristics in an optical transmitter, there is a method in which the inverse characteristic of the performance deterioration factor in the optical transmitter are applied to the signal characteristic by a pre-equalization circuit in the DSP. It should be noted that a method of multiplying the signal characteristic by the inverse characteristic of the transmission line frequency characteristic is known (for example, see Japanese Laid-open Patent Publication No. 2007-096513).

SUMMARY

In one aspect of embodiments, there is provided an optical transmission and reception system including: an optical transmitter that converts an electrical data signal into an optical signal and transmits the optical signal; and an optical receiver that receives the optical signal input from the optical transmitter via an optical transmission line and converts the optical signal into the electrical data signal; wherein the optical transmitter includes a first compensator that compensates for a loss generated in the optical transmitter based on a first coefficient in which an upward peak of a power of a band is on a higher frequency side in a frequency band of the electrical data signal, and a second coefficient in which the power of the band increases as a frequency becomes lower in a part of the band on a lower frequency side than the peak in the frequency band of the electrical data signal, and the optical receiver includes a second compensator that compensates for a loss generated in the optical transmission line based on a third coefficient in which the power of the band decreases as the frequency becomes lower in a part of the band on the lower frequency side than the peak.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an example of a first table according to the first embodiment.

FIG. 13 is an example of a second table according to the first embodiment.

FIG. 23 is an example of a first table according to the third embodiment.

FIG. 26 is an example of a second table according to the third embodiment.

DESCRIPTION OF EMBODIMENTS

Although a DAC (Digital Analog Converter) is disposed behind the DSP in the optical transmitter, the characteristic of the signal intensity (hereinafter referred to as power) of an electrical signal that can be output by the DAC have an upper limit value. For this reason, if a signal includes a power equal to or greater than the upper limit value, the waveform of the signal in the power portion is suppressed to the upper limit value of the DAC and deformed, thereby causing deterioration in signal performance. This deteriorates the transmission characteristics of the optical signal. In order to suppress the occurrence of such signal performance deterioration, it is assumed that the signal power is generally reduced to such an extent that the performance deterioration does not occur before the signal is input to the DAC.

However, even if the power of the signal is reduced, the performance of the signal may deteriorate. For example, in the DAC, a noise such as a quantization noise and a thermal noise occurs. Therefore, the noise is superimposed on the signal that has passed through the DAC. That is, the performance of the signal deteriorates due to noise. The degree of this deterioration depends on SNR (Signal to Noise Ratio), which is the ratio of a noise power to a signal power. If the SNR is sufficiently high, the deterioration of signal performance is negligible, but if the power of the signal is reduced, the SNR is reduced and the signal performance deteriorates. As a result, the transmission characteristic of the optical signal deteriorates.

Accordingly, it is an object of one aspect to provide an optical transmission and reception system, an optical transmitter, and an optical receiver which improve the transmission characteristic of an optical signal.

Hereinafter, an embodiment for carrying out the present disclosure will be described with reference to the drawings.

First Embodiment

Figure 1:
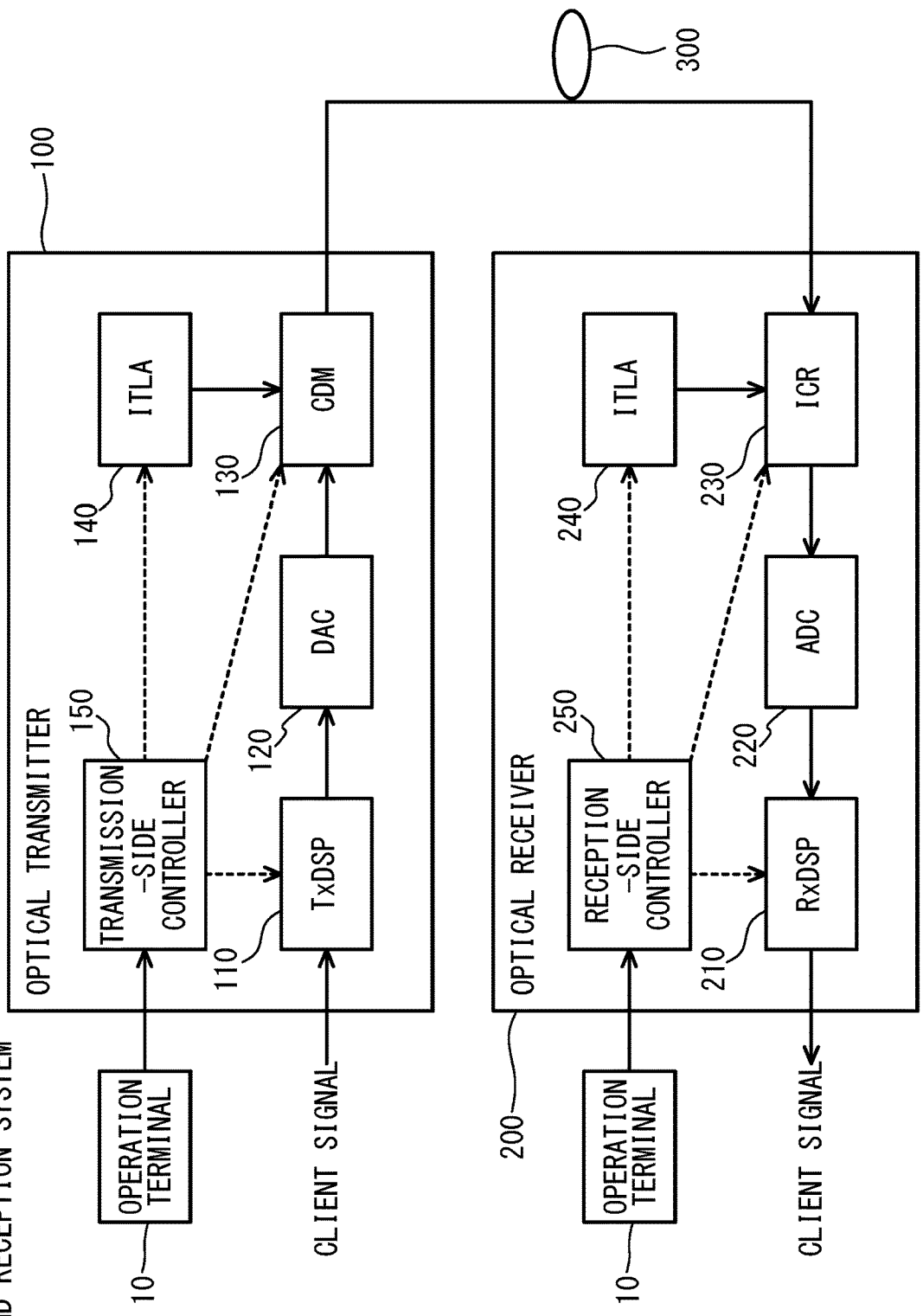
FIG. 1 is a diagram illustrating an example of an optical transmission and reception system.

As illustrated in FIG. 1, an optical transmission and reception system ST includes an optical transmitter 100 and an optical receiver 200. The optical transmitter 100 and the optical receiver 200 are connected to each other via an optical transmission line 300.

Figure 2:
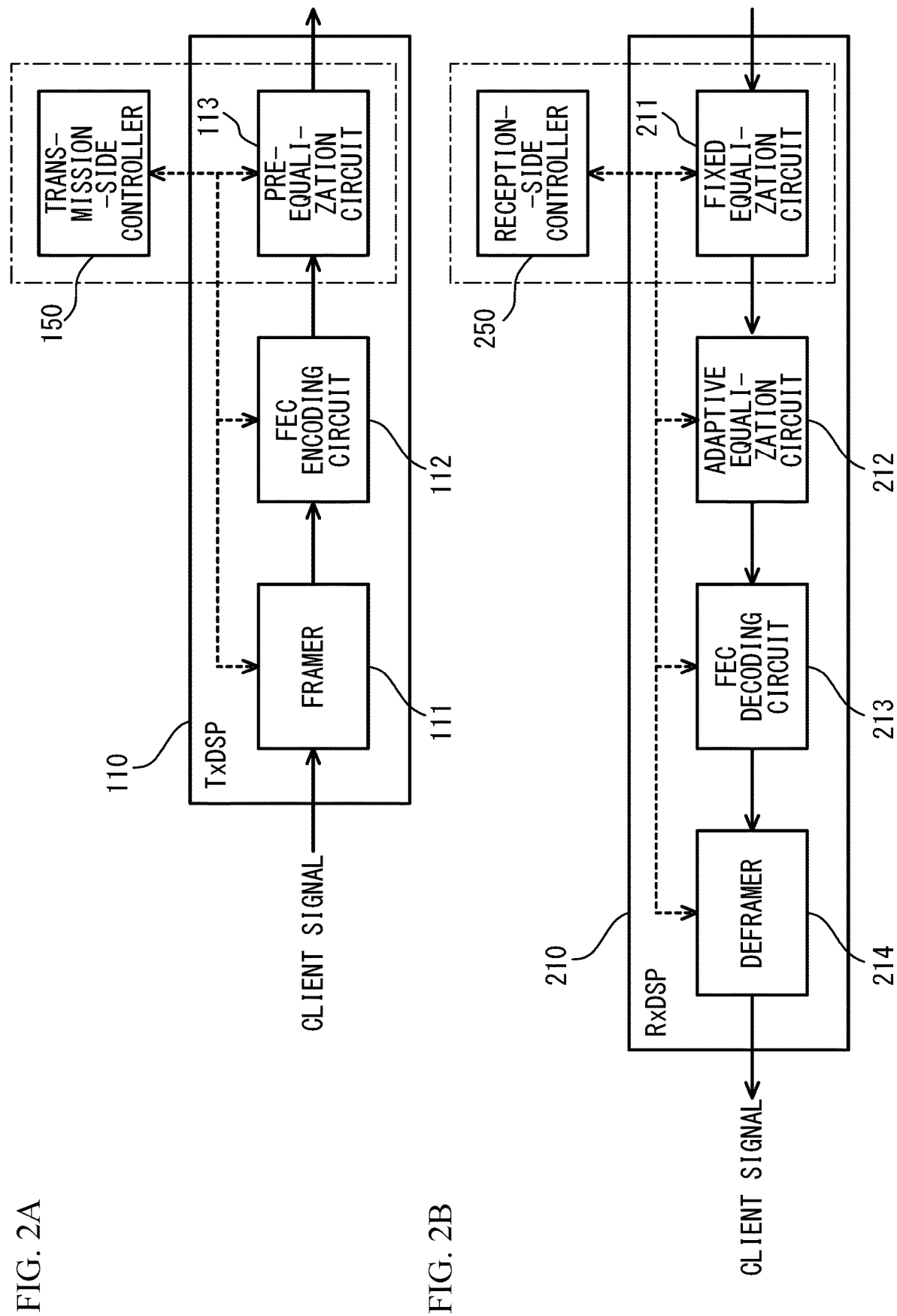
FIG. 2A is a block diagram illustrating an example of a transmission-side DSP.
FIG. 2B is a block diagram illustrating an example of the reception-side DSP.

First, the optical transmitter 100 will be described in detail. The optical transmitter 100 includes a transmission-side DSP (hereinafter referred to as TxDSP) 110, a DAC 120, a CDM (Coherent Driver Modulator) 130, an ITLA (IntegrAble Tunable Laser Assembly) 140, and a transmission-side controller 150. The DAC 120 is an example of a converter. The ITLA 140 is an example of a light source. The transmission-side controller 150 is an example of a first setter. As illustrated in FIG. 2A, the TxDSP 110 includes a framer 111, an FEC (Forward Error Correction) encoding circuit 112, and a pre-equalization circuit 113. The pre-equalization circuit 113 is an example of a first compensator.

The framer 111 receives an electrical client signal in a digital form from the client network. The client signal is, for example, an Ethernet (registered trademark) signal. The client signal may be a main signal or may be a control signal including only parameters for adjusting transmission characteristics. The framer 111 receives the client signal from the client network, converts the client signal into an OTU (Optical Channel Transport Unit) frame, and outputs the OTU frame to the FEC encoding circuit 112. Therefore, the OTU frame is input from the framer 111 to the FEC encoding circuit 112.

The FEC encoding circuit 112 generates an FEC as an example of an error correction code of the OTU frame and inserts it into the OTU frame. The FEC encoding circuit 112 outputs the OTU frame as an electrical data signal to the pre-equalization circuit 113. A mapping circuit may be provided between the FEC encoding circuit 112 and the pre-equalization circuit 113. The mapping circuit maps the bit data of the OTU frame to the symbol by performing digital modulation processing according to a Baud Rate and a modulation scheme (specifically, a multi-level modulation scheme) set by the transmission-side controller 150. The mapping circuit outputs the electrical data signal obtained by the digital modulation processing to the pre-equalization circuit 113.

The pre-equalization circuit 113 compensates in advance for various losses generated in the optical transmitter 100 based on a first compensation coefficient, which will be described later. For example, the pre-equalization circuit 113 performs skew compensation and band characteristic compensation. The pre-equalization circuit 113 outputs the compensated data signal to the DAC 120.

Although details will be described later, the pre-equalization circuit 113 performs scaling on the data signal. The scaling is a process of suppressing the power (for example, an amplitude level) of a data signal to an upper limit value or less of the DAC 120. Specifically, the scaling is a process of reducing the power of the data signal as a whole to an upper limit value or less of the DAC 120. Thus, when the power of the data signal exceeds the upper limit value of the DAC 120, clipping in which the power of the data signal partially sticks to the upper limit value of the DAC 120 can be avoided.

Referring back to FIG. 1, the DAC 120 converts a data signal from the digital form to the analog form and outputs the converted signal to the CDM 130. The CDM 130 includes an optical modulator, a polarization beam splitter, and a polarization beam combiner. The CDM 130 separates the transmission light input from the ITLA 140 into an H-polarized wave and a V-polarized wave, and optically modulates them with a data signal. The CDM 130 generates an optical signal by combining the modulated light of the H-polarized wave and the V-polarized wave, and outputs the optical signal to the optical transmission line 300. In this manner, the optical transmitter 100 converts the data signal into an optical signal and transmits it to the optical receiver 200.

The transmission-side controller 150 includes a processor and a memory, and as illustrated in FIG. 1, controls the operation of the TxDSP 110, the CDM 130, and the ITLA 140. The processor includes, for example, a CPU (Central Processing Unit). When controlling the operation of the TxDSP 110, the transmission-side controller 150 controls the operation of the framer 111, the FEC encoding circuit 112, and the pre-equalization circuit 113, as illustrated in FIG. 2A. The transmission-side controller 150 performs various settings on the framer 111, the FEC encoding circuit 112, and the pre-equalization circuit 113 according to the control of an operation terminal 10 (see FIG. 1). The operation terminal 10 may be a PC (Personal Computer) or a smart terminal (such as a tablet terminal). The transmission-side controller 150 sets a line rate to the framer 111 and sets a redundancy of the FEC to the FEC encoding circuit 112.

The transmission-side controller 150 generates the first compensation coefficient described above and sets the first compensation coefficient to the pre-equalization circuit 113. The transmission-side controller 150 generates the first compensation coefficient based on the first coefficient and the second coefficient. Specifically, the transmission-side controller 150 generates the first compensation coefficient by superimposing the first coefficient and the second coefficient on each other. The first coefficient is a coefficient for amplifying the power of a band on a higher frequency side in the frequency band of the data signal. The first coefficient can compensate for a loss (e.g., the intersymbol interference due to band characteristics) generated in the optical transmitter 100. On the other hand, the second coefficient is a coefficient for amplifying the power of a band on a lower frequency side of the frequency band of the data signal. The second coefficient can make the signal quality (specifically, SNR) of the data signal equal to or higher than a predetermined value that avoids deterioration of the transmission performance of the optical signal.

Next, the optical receiver 200 will be described in detail. As illustrated in FIG. 1, the optical receiver 200 includes a reception-side DSP (hereinafter referred to as "RxDSP") 210, an ADC (Analog Digital Converter) 220, an ICR (Integrated Coherent Receiver) 230, an ITLA 240, and a reception-side controller 250. The ITLA 240 is an example of a light source. The reception-side controller 250 is an example of a second setter.

The optical signal transmitted from the optical transmitter 100 and passed through the optical transmission line 300 is input to the ICR 230. The ICR 230 includes a polarization beam splitter, an optical-electric converter, and the like. The ICR 230 separates the optical signal into H-polarized and V-polarized components, receives the optical signal by local oscillation light input from the ITLA 240, converts the optical signal into an electrical data signal, and outputs the electrical data signal to the ADC 220. That is, the optical receiver 200 receives the optical signal input from the optical transmitter 100 via the optical transmission line 300 and converts the received optical signal into the data signal. The ADC 220 converts the data signal from the analog form to the digital form and outputs it to the RxDSP 210.

As illustrated in FIG. 2B, the RxDSP 210 includes a fixed equalization circuit 211, an adaptive equalization circuit 212, an FEC decoding circuit 213, and a deframer 214. The fixed equalization circuit 211 is an example of a second compensator.

The fixed equalization circuit 211 fixedly compensates the loss generated in the optical transmitter 100, the optical receiver 200, and the optical transmission line 300 for the data signal based on a second compensation coefficient described later. For example, the fixed equalization circuit 211 performs wavelength dispersion compensation, skew compensation, and band characteristic compensation. The fixed equalization circuit 211 outputs the compensated data signal to the adaptive equalization circuit 212.

The adaptive equalization circuit 212 adaptively compensates waveform distortion of the optical signal caused by polarization mode dispersion or polarization dependent loss generated on the optical transmission line 300 for the data signal based on dynamic parameters. The adaptive equalization circuit 212 outputs the compensated data signal as the OTU frame to the FEC decoding circuit 213. Note that a demapping circuit may be provided between the adaptive equalization circuit 212 and the FEC decoding circuit 213. The demapping circuit detects the symbol by demapping processing, converts it into the bit data, and demodulates the OTU frame from the data signal.

The FEC decoding circuit 213 extracts the FEC from the OTU frame and performs data error correction. The FEC decoding circuit 213 outputs the OTU frame to the deframer 214. The deframer 214 receives the OTU frame from the FEC decoding circuit 213, converts the OTU frame into the client signal, and transmits the client signal to the client network.

The reception-side controller 250 includes a processor and a memory, and controls the operation of the RxDSP 210, the ICR 230, and the ITLA 240, as illustrated in FIG. 1. When controlling the operation of the RxDSP 210, the reception-side controller 250 controls the operation of the fixed equalization circuit 211, the adaptive equalization circuit 212, the FEC decoding circuit 213, and the deframer 214, as illustrated in FIG. 2B. The reception-side controller 250 performs various settings on the fixed equalization circuit 211, the adaptive equalization circuit 212, the FEC decoding circuit 213, and the deframer 214 according to control from the operation terminal 10 (see FIG. 1).

The reception-side controller 250 generates the above-described second compensation coefficient and sets the second compensation coefficient to the fixed equalization circuit 211. The reception-side controller 250 generates the second compensation coefficient based on a third coefficient and a fourth coefficient. Specifically, the reception-side controller 250 generates the second compensation coefficient by superimposing the third coefficient and the fourth coefficient on each other. The third coefficient is a coefficient for amplifying the data signal. The third coefficient can compensate for the loss that occurs in the optical receiver 200 and the optical transmission line 300. The fourth coefficient is a coefficient for amplifying (I.e., attenuating) the data signal based on an amplification characteristic opposite to that of the second coefficient. The fourth coefficient may offset the second coefficient employed for the purpose of temporarily improving the signal quality.

As described above, since the power of the band on the lower frequency side is amplified by the optical transmitter 100 side based on the second coefficient to make the signal quality of the data signal equal to or higher than the predetermined value, and the signal quality of the data signal is restored by the optical receiver 200 side based on the fourth coefficient having the amplification characteristic opposite to that of the second coefficient, it is possible to improve the characteristics of the entire signal.

Next, the details of the transmission-side controller 150 according to the first embodiment will be described with reference to FIGS. 3 to 11.

Figure 3:
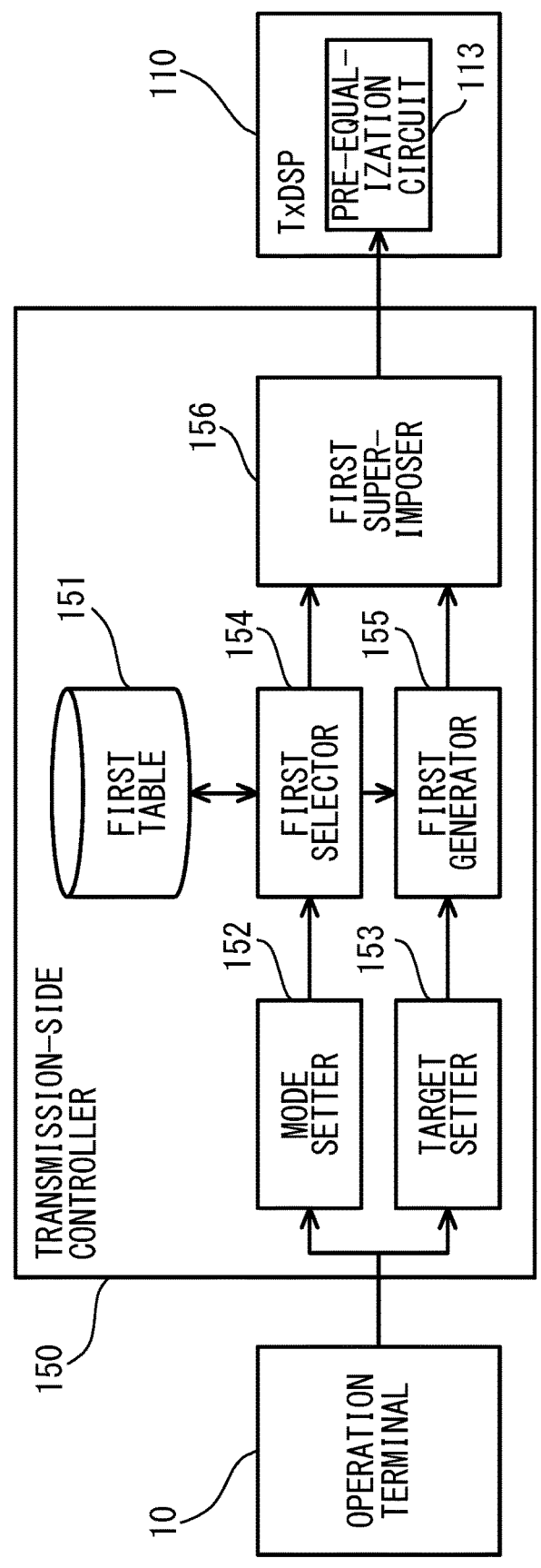
FIG. 3 is a block diagram illustrating an example of a transmission-side controller according to a first embodiment.

First, as illustrated in FIG. 3, the transmission-side controller 150 includes a first table 151, a mode setter 152, and a target setter 153. The transmission-side controller 150 includes a first selector 154, a first generator 155, and a first superimposer 156. As illustrated in FIG. 4, the first table 151 includes an operation mode number, a baud rate, a modulation scheme, and a first coefficient in association with each other. The operation mode number in the first table 151 is an identifier for identifying the operation mode of the optical transmitter 100. Once the operation mode number is specified, the baud rate, the modulation scheme, and the first coefficient associated with the specified operation mode number can be determined. As a result, the optical transmitter 100 can be operated with the baud rate, the modulation scheme, and the first coefficient in accordance with the designated operation mode number. It is also possible to specify at least one of the baud rate and the modulation method without providing the operation mode number and to determine the first coefficient in accordance with at least one of the specified baud rate and modulation method.

Figure 5:
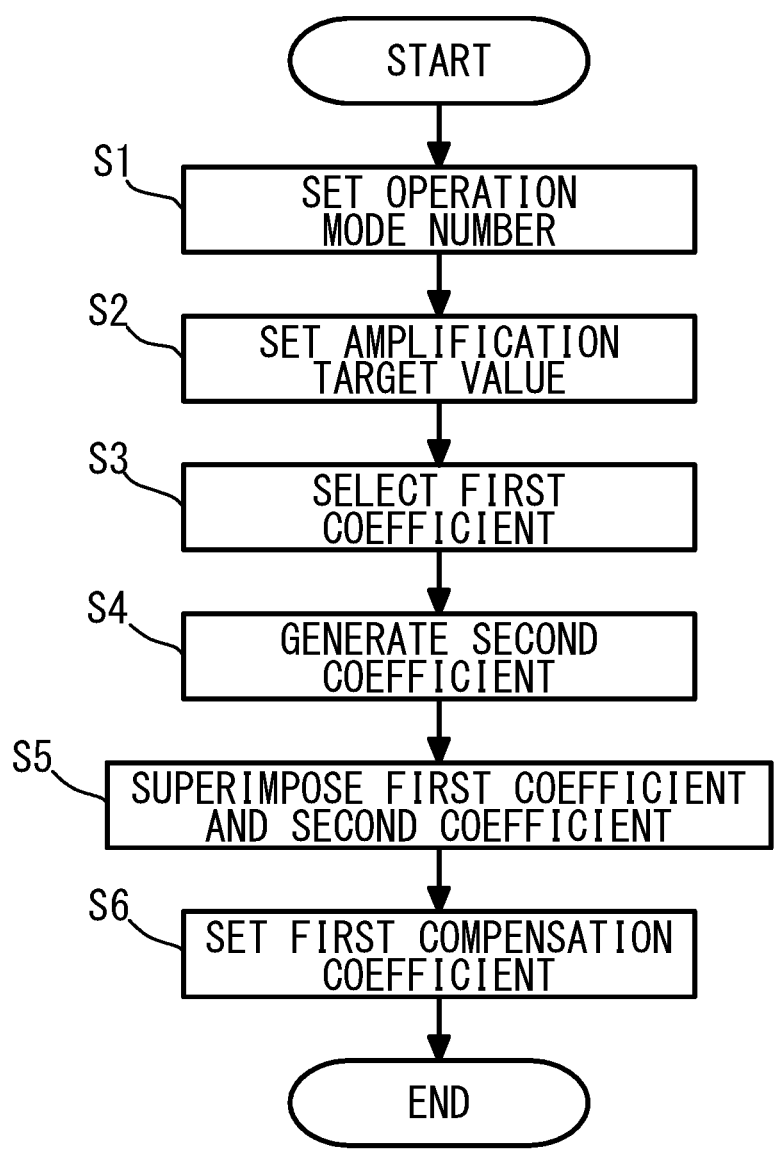
FIG. 5 is a flowchart illustrating an example of the operation of an optical transmitter according to the first embodiment.

As illustrated in FIG. 5, the mode setter 152 sets an operation mode number to itself in accordance with the control from the operation terminal 10 (step S1). When the operation mode number is set, the target setter 153 sets the amplification target value to itself in accordance with the control from the operation terminal 10 (step S2). The amplification target value is a target value of the power of the band on the lower frequency side to be amplified. The processing in steps S1 and S2 may be performed at the same timing or at different timings.

When the amplification target value is set, the first selector 154 selects the first coefficient corresponding to the operation mode number set in the mode setter 152 from the first table 151 together with the baud rate and the modulation scheme (step S3). The first selector 154 outputs the selected baud rate, the selected modulation scheme, and the selected first coefficient to the first superimposer 156. The first selector 154 also outputs the first coefficient to the first generator 155. When the first coefficient is output from the first selector 154, the first generator 155 generates the second coefficient based on the amplification target value set in the target setter 153 and the first coefficient (step S4).

Figure 6:
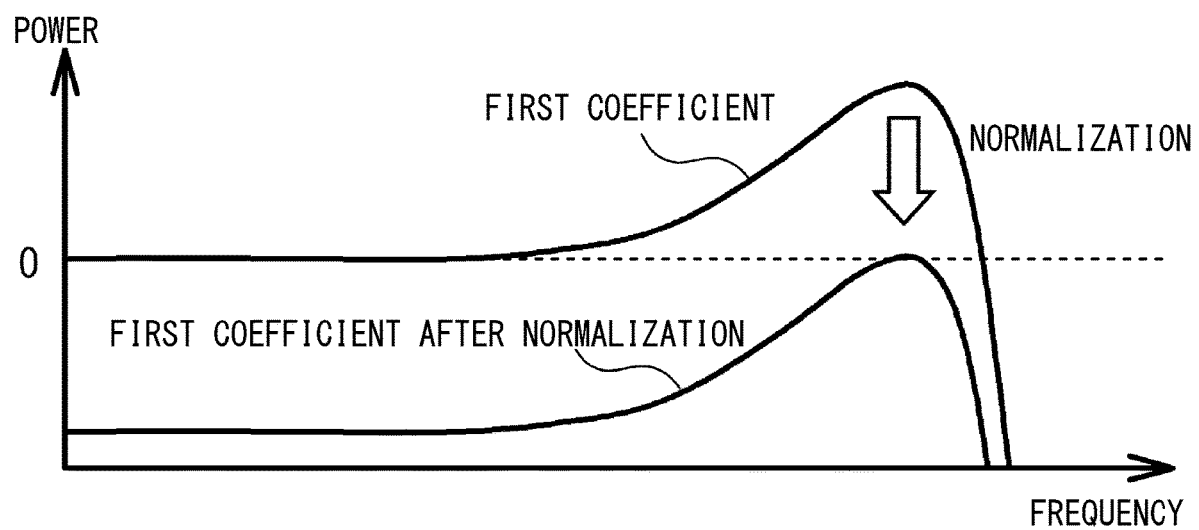
FIG. 6 is a diagram illustrating an example of normalization of a first coefficient.

Specifically, as illustrated in FIG. 6, first, the first generator 155 normalizes the characteristic of the first coefficient. Normalization is a process of lowering the characteristic of the first coefficient as a whole so that the maximum power in the first coefficient is set to "0". The characteristic of the first coefficient may be normalized so as to be the upper limit value of the DAC 120. When the characteristic of the first coefficient is normalized, the first generator 155 calculates a relative attenuation amount with respect to the power "0" for each frequency component.

Figure 7:
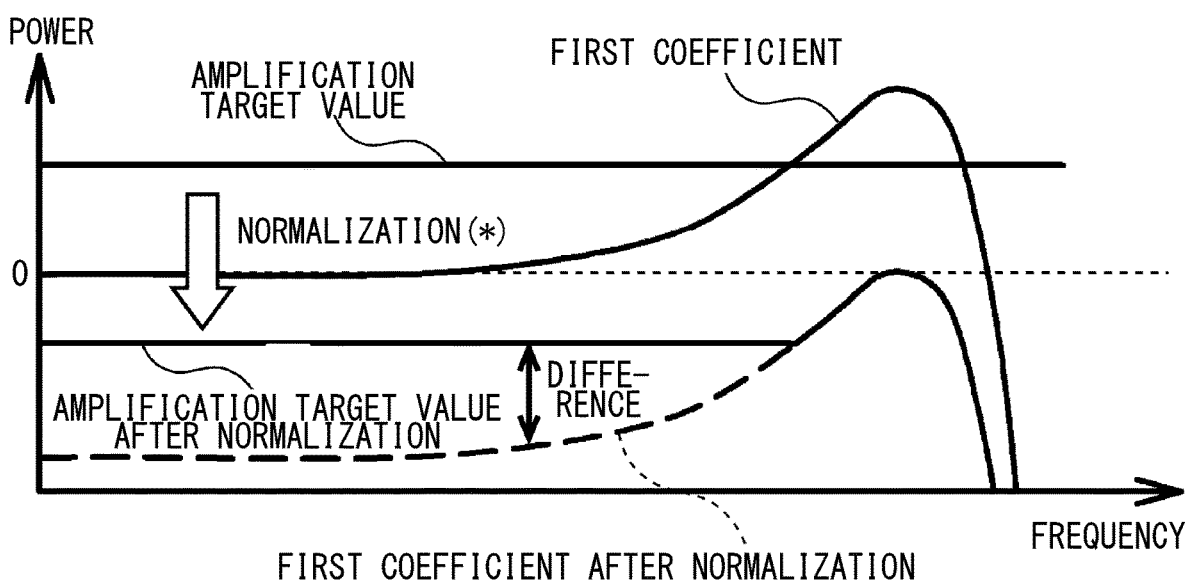
FIG. 7 is a diagram illustrating an example of normalization of an amplification target value.

Next, as illustrated in FIG. 7, the first generator 155 normalizes the characteristic of the amplification target value in the same manner as the normalization for the first coefficient. Specifically, the first generator 155 entirely attenuates the characteristic of the amplification target value for each frequency component by the same attenuation amount as the attenuation amount of the characteristic of the first coefficient. As a result, the characteristic of the amplification target value after the normalization lower than the power "0" is obtained. When the characteristic of the amplification target value after the normalization is obtained, the first generator 155 calculates a difference between the amplification target value after the normalization and the first coefficient after the normalization (the amplification target value after the normalization minus the first coefficient after the normalization) for each frequency component. Here, when the amplification target value after the normalization becomes equal to or less than the first coefficient after the normalization (i.e., the difference ≤0), the first generator 155 adopts the first coefficient after the normalization as the amplification target value after the normalization. As a result, the first generator 155 obtains the characteristic of the amplification target value after the normalization which partially includes the first coefficient after the normalization on the higher frequency side. In this specification, a frequency band in which the amplification target value after the normalization exceeds the first coefficient after the normalization (i.e., difference >0) is referred to as a low frequency band.

Figure 8:
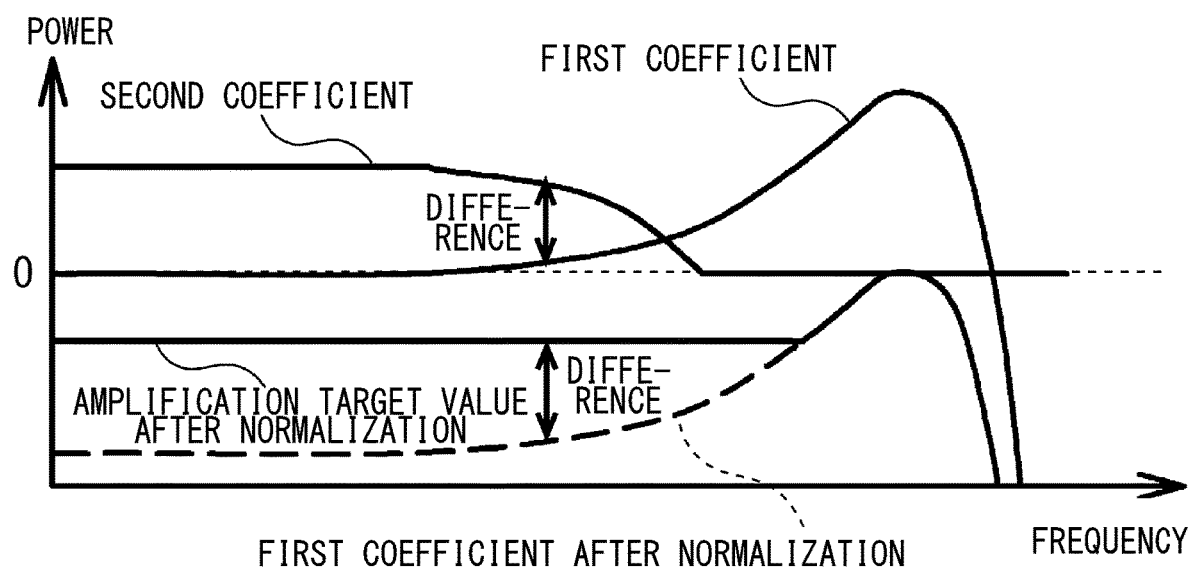
FIG. 8 is a diagram illustrating an example of generating a second coefficient.

Next, as illustrated in FIG. 8, the first generator 155 subtracts the first coefficient from the difference (i.e., the first coefficient before difference-normalization) to generate the second coefficient. In other words, the first generator 155 generates a characteristic obtained by subtracting the first coefficient from the difference as the characteristic of the second coefficient.

When the characteristic of the second coefficient falls below the power "0", the first generator 155 fixes the characteristic of the second coefficient to the power "0". If the characteristic of the second coefficient falls below the power "0", there is a possibility that the signal quality of the data signal based on the second coefficient may fall below a predetermined value. This possibility can be avoided by fixing the characteristic of the second coefficient to the power "0". The first generator 155 outputs the generated second coefficient to the first superimposer 156. The operation terminal 10 can access the first generator 155 to refer to the second coefficient, or can acquire the second coefficient from the first generator 155.

Returning to FIG. 5, the first superimposer 156 superimposes the first coefficient output from the first selector 154 and the second coefficient output from the first generator 155 (step S5). The first superimposer 156 superimposes the first coefficient and the second coefficient with each other to generate the above-described first compensation coefficient. When the first compensation coefficient is generated, the first superimposer 156 sets the first compensation coefficient to the pre-equalization circuit 113 of the TxDSP 110 (step S6), and ends the process.

Figure 9:
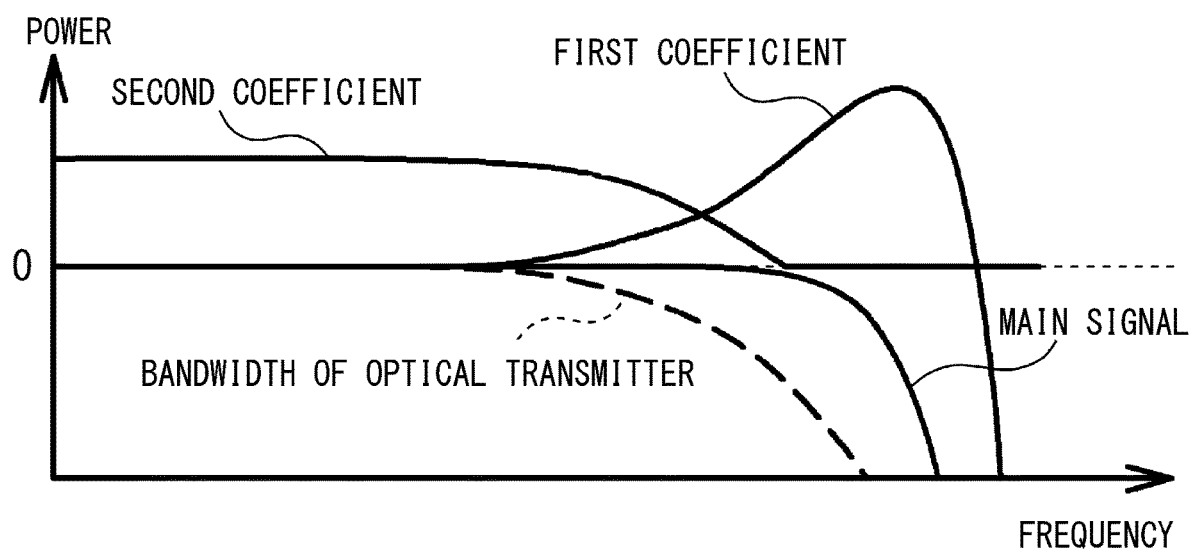
FIG. 9 is a diagram illustrating an example of superimposition of a first coefficient and a second coefficient.
Figure 10:
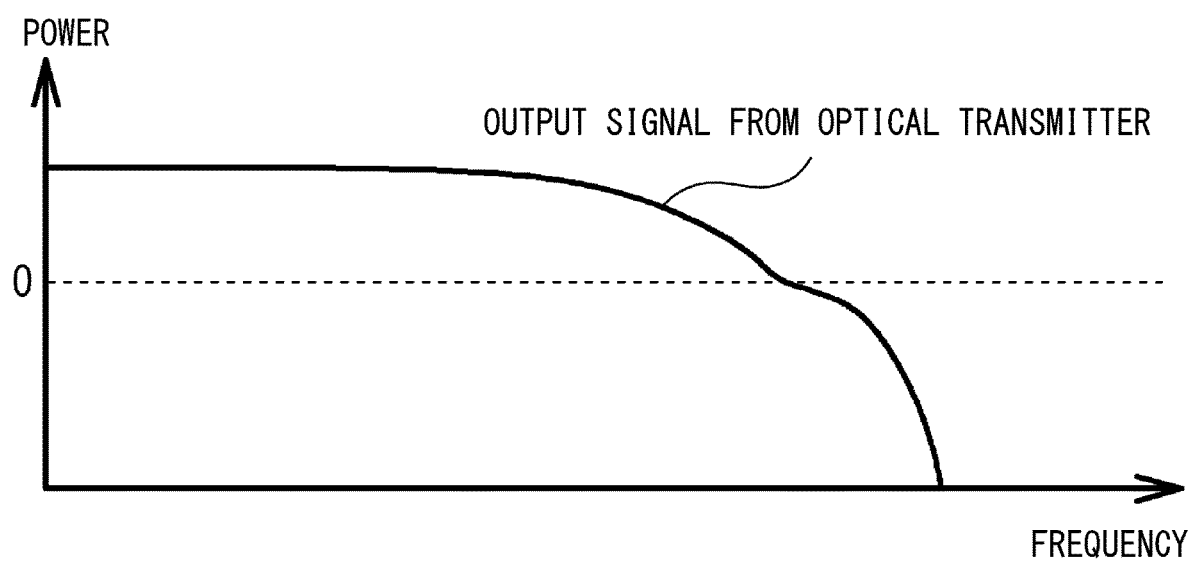
FIG. 10 is a diagram illustrating an example of an output signal from an optical transmitter.

Thus, as illustrated in FIG. 9, for example, when the data signal is the main signal and the bandwidth of the optical transmitter 100 is insufficient with respect to the main signal, the first compensation coefficient generated by superimposing the first coefficient and the second coefficient can be applied to the main signal. Here, in the first coefficient, an upward peak of the power of the band is on the higher frequency side, and the first coefficient compensates for the loss such as the intersymbol interference due to the band characteristics generated in the optical transmitter 100. On the other hand, in the second coefficient, the power of the band increases as the frequency becomes lower in a part of the band on the lower frequency side than the peak of the first coefficient, thereby compensating for a reduction in signal quality on the low frequency band side caused by the scaling. Therefore, the characteristic of the second coefficient remains without being offset by the bandwidth of the optical transmitter 100, and as illustrated in FIG. 10, an output signal in which the remaining second coefficient is applied to the main signal is output from the optical transmitter 100 as the optical signal. The first superimposer 156 sets the baud rate and the modulation scheme output from the first selector 154 to a mapping circuit (not illustrated) of the TxDSP 110. The set baud rate and the set modulation scheme are used for transmission of the main signal.

Now, the above-described clipping and scaling will be described with reference to FIGS. 11A to 11C.

Figure 11A:
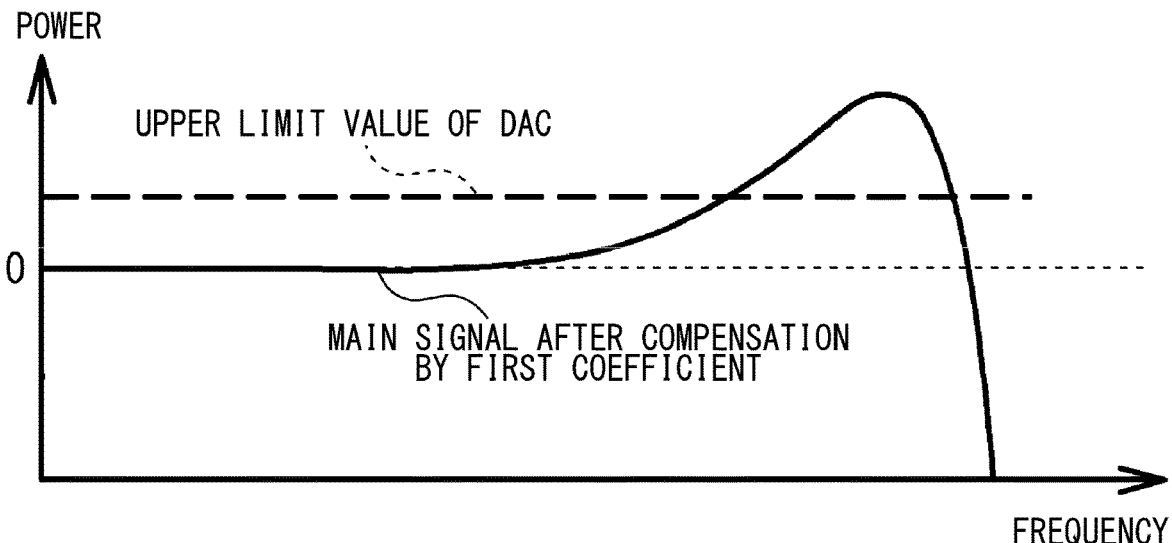
FIG. 11A is a diagram illustrating an example of an upper limit value of the DAC.
Figure 11B:
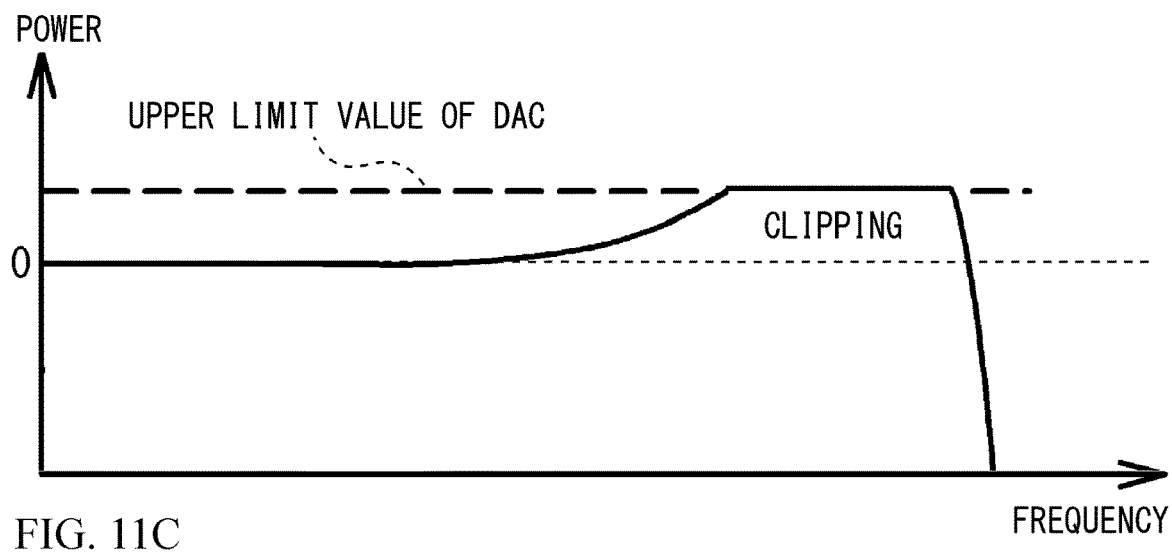
FIG. 11B is a diagram illustrating an example of clipping.

First, as illustrated in FIG. 11A, the DAC 120 has an upper limit value for the power of the electrical data signal that can be output. For example, when the characteristic of the main signal after compensation by the first coefficient becomes equal to or more than the upper limit value, the clipping occurs in which a portion of the main signal having the upper limit value or more sticks to the upper limit value regardless of its original characteristic, as illustrated in FIG. 11B. Since the characteristic of the main signal is changed by the clipping compared with the original characteristic, the signal quality of the main signal is deteriorated.

Figure 11C:
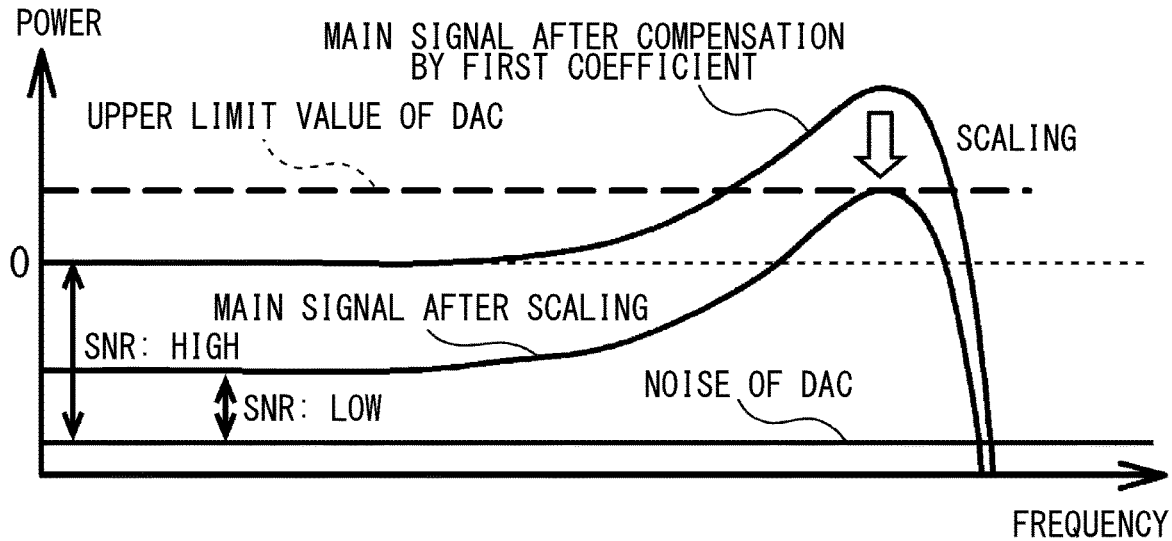
FIG. 11C is a diagram illustrating an example of scaling.

In order to avoid the clipping, it is also assumed that the characteristic of the main signal is scaled so that the power is reduced to a level at which the clipping does not occur in the pre-equalization circuit 113, and then input to the DAC 120, as illustrated in FIG. 11C. However, the scaled main signal may deteriorate the transmission performance of the main signal in relation to the noise of the DAC 120. Specifically, in the case of the main signal before the scaling in a low frequency band, the SNR between the main signal and the noise of the DAC 120 can ensure a sufficiently high value such an extent that deterioration of the transmission performance of the main signal is negligible. However, in the case of the main signal after the scaling, the SNR between the main signal and the noise of the DAC 120 is reduced, and the transmission performance of the main signal is deteriorated. Therefore, in the present embodiment, the characteristic of the low frequency band of the data signal such as the main signal is improved by the second coefficient.

Next, the details of the reception-side controller 250 according to the first embodiment will be described with reference to FIGS. 12 to 16.

Figure 12:
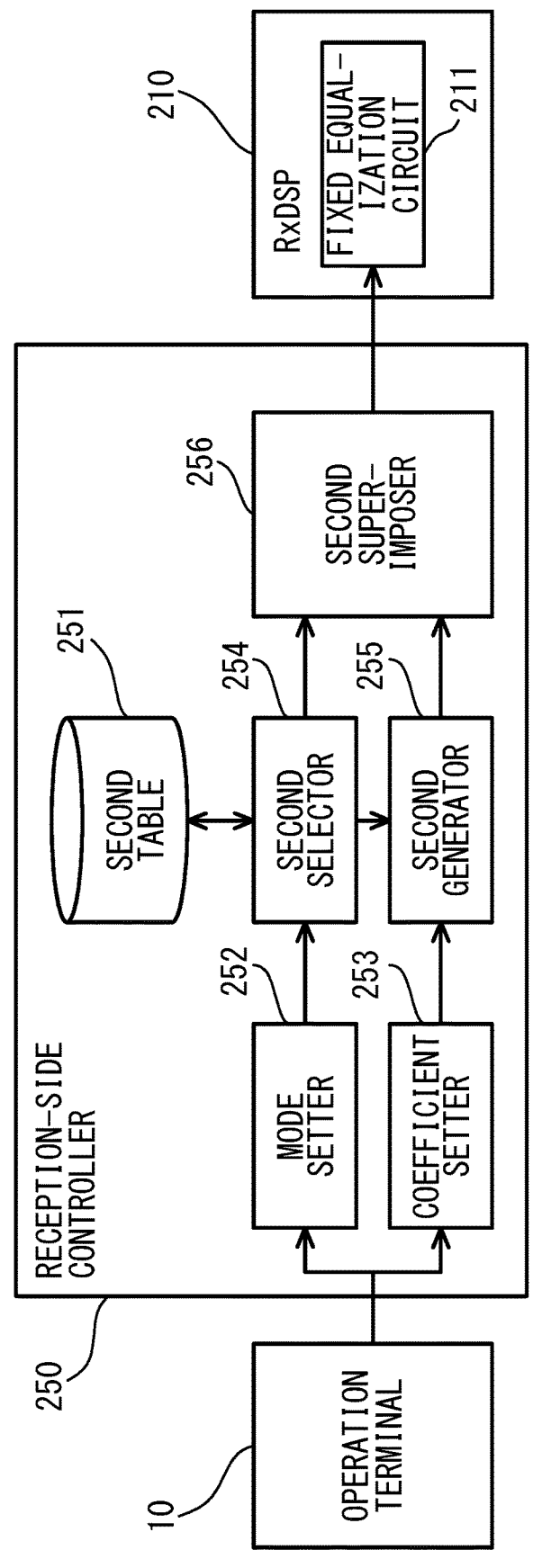
FIG. 12 is a block diagram illustrating an example of a reception-side controller according to the first embodiment.

First, as illustrated in FIG. 12, the reception-side controller 250 includes a second table 251, a mode setter 252, and a coefficient setter 253. The reception-side controller 250 includes a second selector 254, a second generator 255, and a second superimposer 256. As illustrated in FIG. 13, the second table 251 includes an operation mode number, a baud rate, a modulation scheme, and a third coefficient in association with each other. The operation mode number in the second table 251 is an identifier for identifying the operation mode of the optical receiver 200. Once the operation mode number is specified, the baud rate, the modulation scheme, and the third factor associated with the specified operation mode number can be determined. As a result, the optical receiver 200 can be operated with the baud rate, the modulation scheme and the third coefficient corresponding to the designated operation mode number. It is also possible to specify at least one of the baud rate and the modulation method without providing the operation mode number, and to determine the third coefficient in accordance with at least one of the specified baud rate and the specified modulation method.

Figure 14:
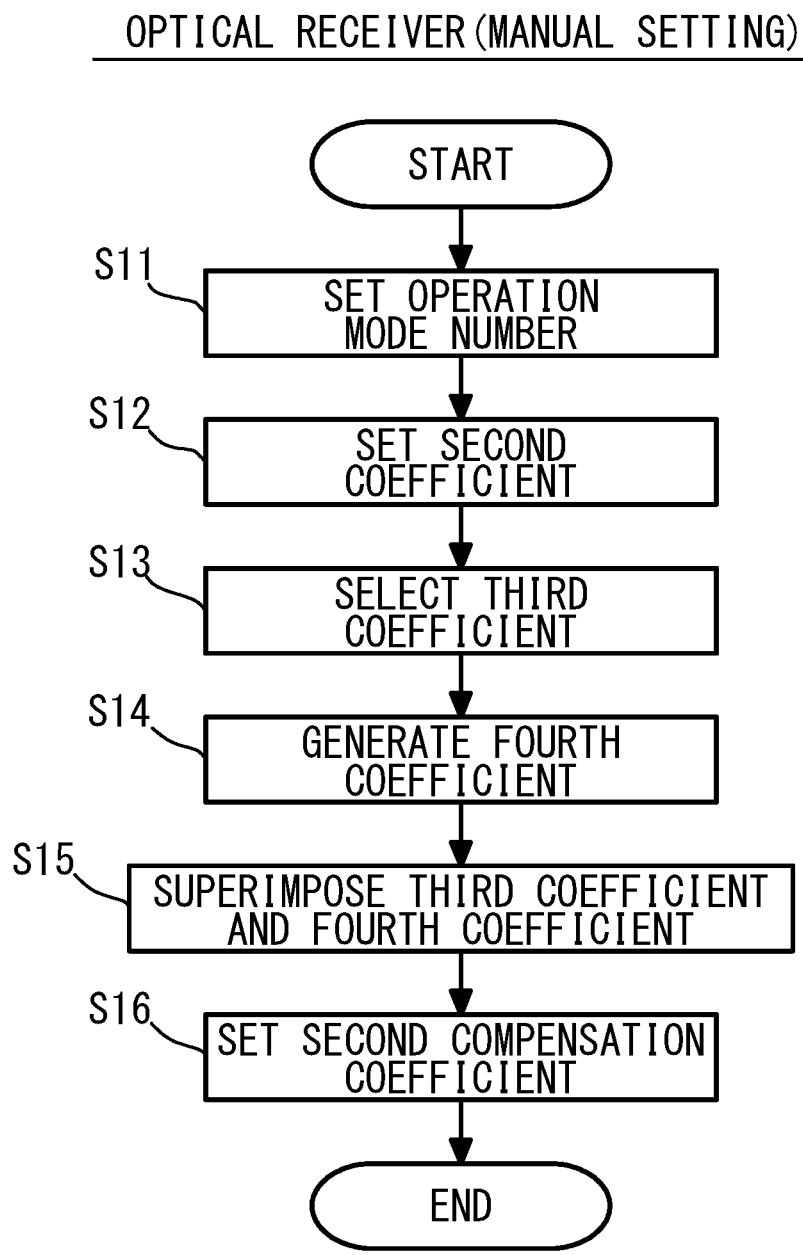
FIG. 14 is a flowchart illustrating an example of the operation of an optical receiver according to the first embodiment.

As illustrated in FIG. 14, the mode setter 252 sets the operation mode number to itself in accordance with the control from the operation terminal 10 (step S11). When the operation mode number is set, the coefficient setter 253 sets the second coefficient to itself in accordance with the control from the operation terminal 10 (step S12). With regard to the setting of the second coefficient, the operation terminal 10 may acquire the second coefficient from the transmission-side controller 150 (specifically, the first generator 155) after the operation terminal 10 completes the setting for the transmission-side controller 150. By reconnecting the operation terminal 10 from the optical transmitter 100 to the optical receiver 200, the operation terminal 10 can set the second coefficient in the coefficient setter 253. The processing in steps S11 and S12 may be performed at the same timing or at different timings.

Figure 15:
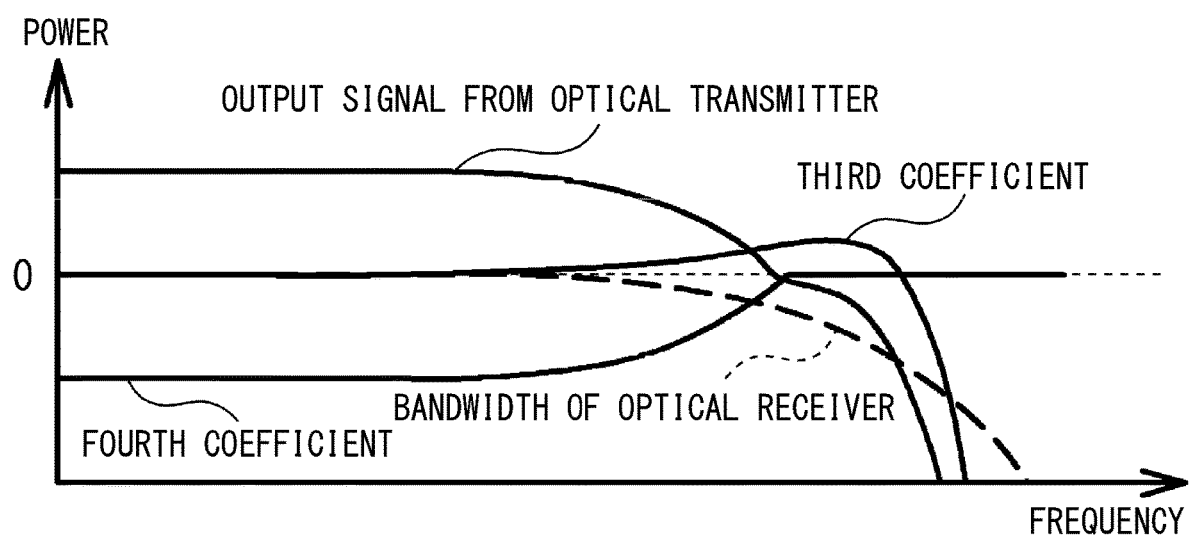
FIG. 15 is a diagram illustrating an example of superimposition of a third coefficient and a fourth coefficient.

When the operation mode number is set in the mode setter 252, the second selector 254 selects the third coefficient corresponding to the set operation mode number from the second table 251 together with the baud rate and the modulation scheme (step S13). As illustrated in FIG. 15, in the third coefficient, the power of the band decreases as the frequency becomes lower in a part of the band on the lower frequency side than the peak of the first coefficient. The second selector 254 outputs the selected baud rate, the selected modulation scheme, and the selected third coefficient to the second superimposer 256.

When the second coefficient is set in the coefficient setter 253, the second generator 255 generates the fourth coefficient based on the second coefficient (step S14). Specifically, as illustrated in FIG. 15, the second generator 255 generates the fourth coefficient based on the amplification characteristic opposite to the characteristic of the second coefficient. In other words, the second generator 255 generates the amplification characteristic opposite to the characteristic of the second coefficient as the characteristic of the fourth coefficient. The second generator 255 outputs the generated fourth coefficient to the second superimposer 256. The processing in steps S13 and S14 may be performed at the same timing or at different timings.

Returning to FIG. 14, the second superimposer 256 superimposes the third coefficient output from the second selector 254 and the fourth coefficient output from the second generator 255 (step S15). The second superimposer 256 superimposes the third coefficient and the fourth coefficient to generate the above-described second compensation coefficient. When the second compensation coefficient is generated, the second superimposer 256 sets the second compensation coefficient in the fixed equalization circuit 211 of the RxDSP 210 (step S16), and ends the process.

Figure 16:
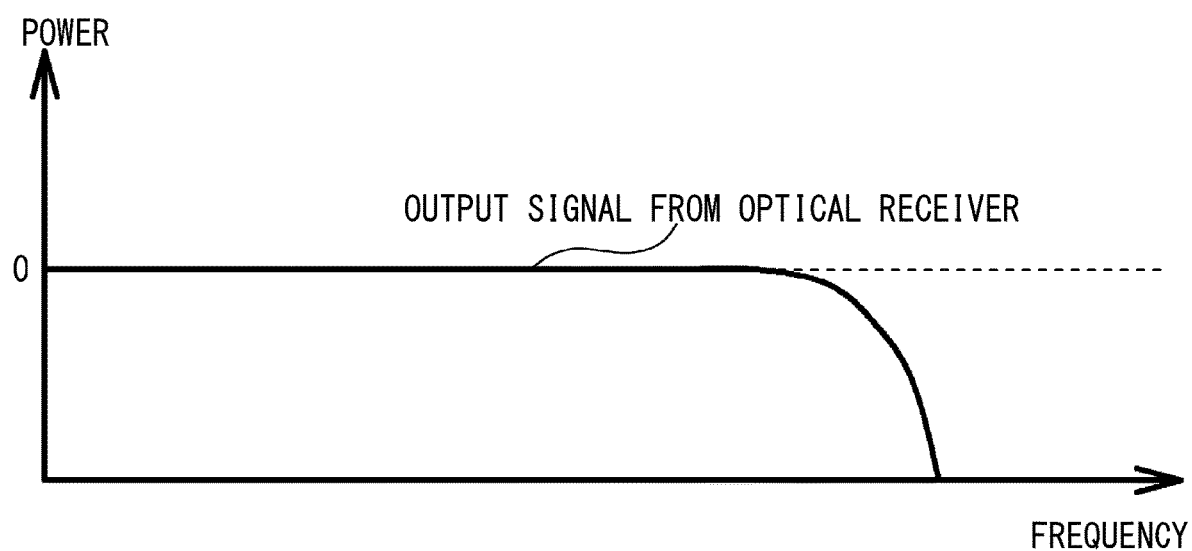
FIG. 16 is a diagram for explaining an example of an output signal from the optical receiver.

Thus, as illustrated in FIG. 15, for example, when the data signal is the main signal and the bandwidth of the optical receiver 200 is insufficient with respect to the main signal, the second compensation coefficient generated by superimposing the third coefficient and the fourth coefficient can be applied to the main signal. The third coefficient can compensate for the loss such as the intersymbol interference due to band characteristics generated in the optical receiver 200 and the optical transmission line 300. The fourth coefficient can offset the second coefficient employed for the purpose of temporarily improving the signal quality. Therefore, as illustrated in FIG. 16, the output signal in which the second compensation coefficient is applied to the main signal is output from the optical receiver 200 as the client signal. The second superimposer 256 sets the baud rate and the modulation scheme output from the second selector 254, to a demapping circuit (not illustrated) in the RxDSP 210.

As described above, according to the first embodiment, even if normalization such as the scaling is performed when the power characteristic of the electric signal that can be output by the DAC 120 has the upper limit value, the signal quality in the low frequency band is not reduced and the transmission characteristic of the optical signal can be improved.

Second Embodiment

Next, a second embodiment of the present disclosure will be described with reference to FIGS. 17 to 21. In the first embodiment described above, the transmission-side controller 150 generates the second coefficient, and the reception-side controller 250 uses the second coefficient via the operation terminal 10 to generate the fourth coefficient. In the second embodiment, the second coefficient generated by the transmission-side controller 150 is transmitted from the optical transmitter 100 to the optical receiver 200, and the reception-side controller 250 uses the received second coefficient to generate the fourth coefficient.

Figure 17:
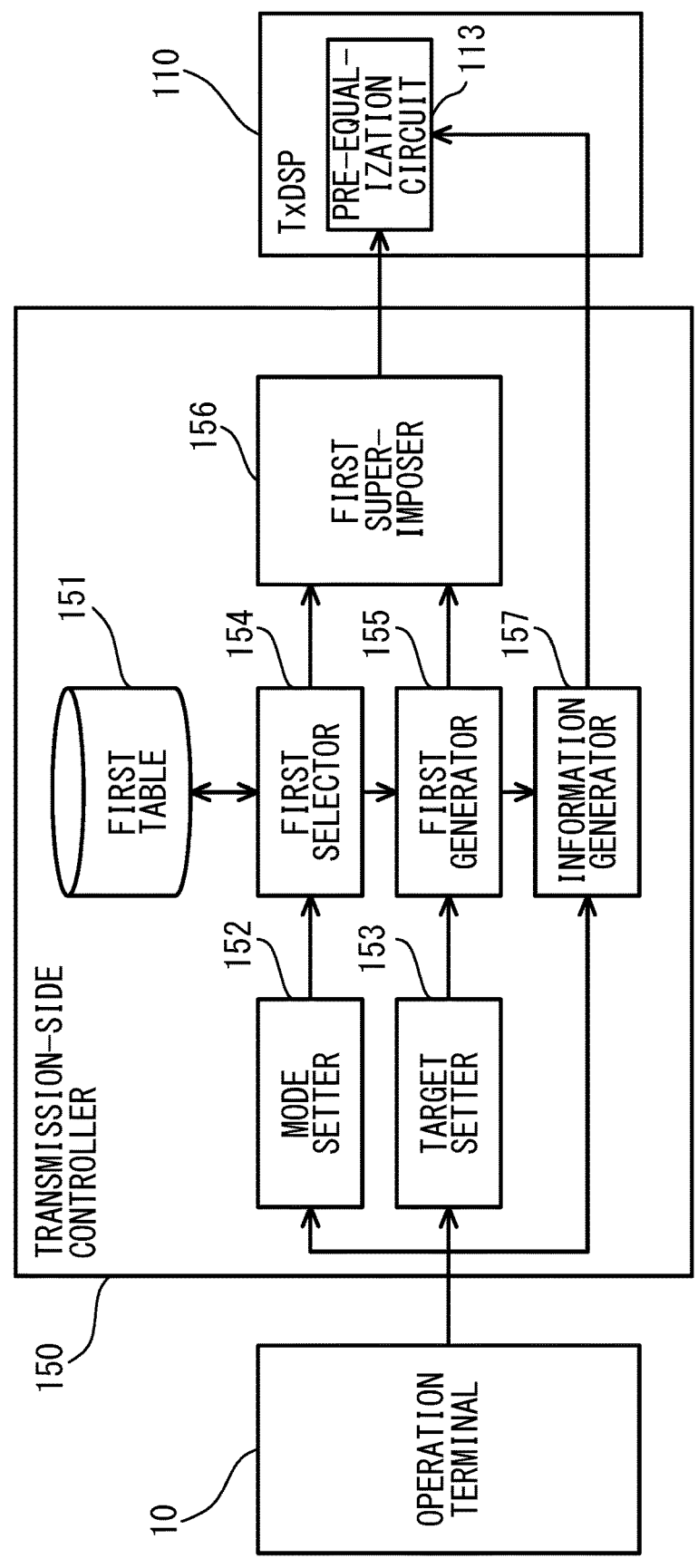
FIG. 17 is a block diagram illustrating an example of a transmission-side controller according to the second embodiment.
Figure 18:
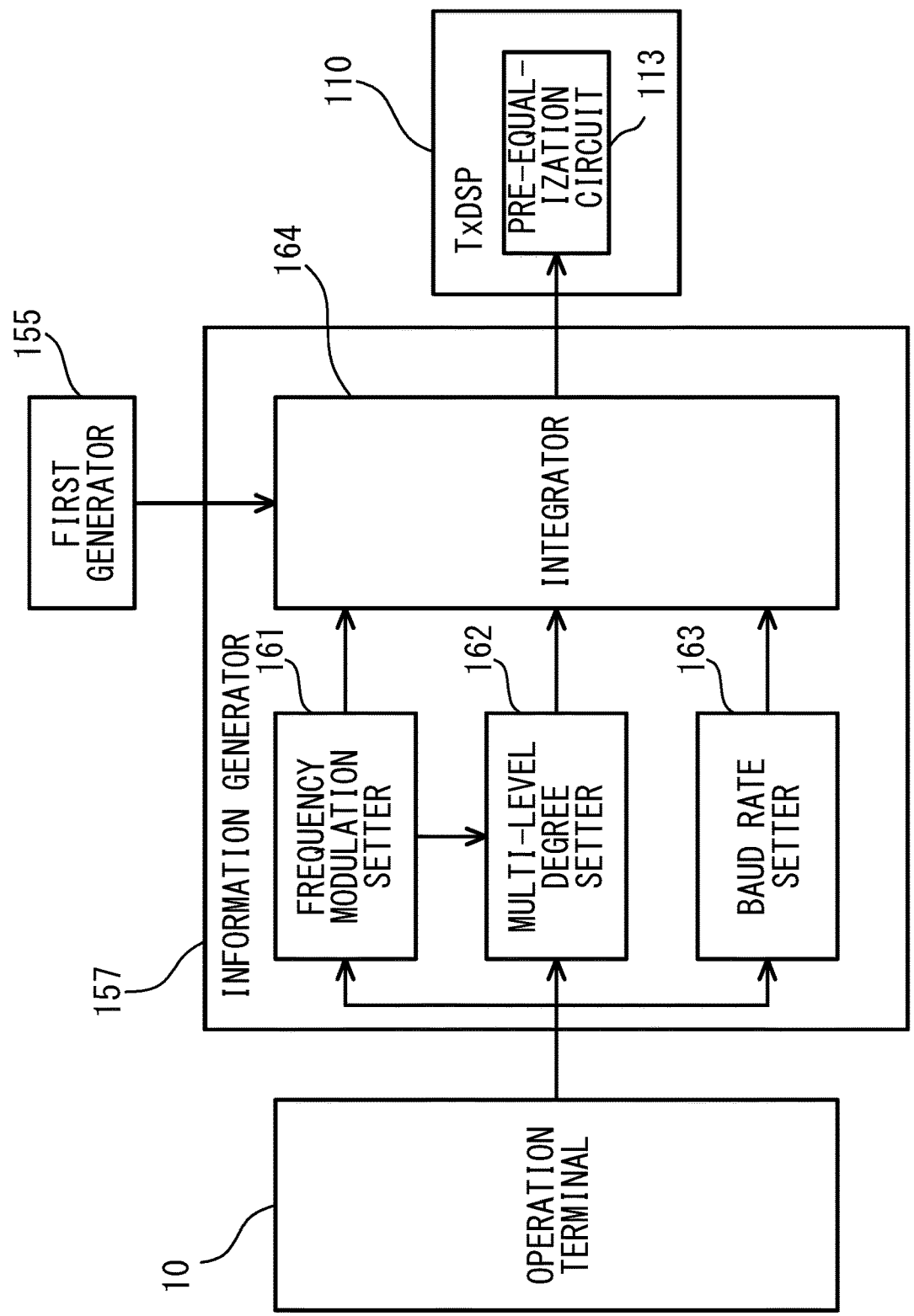
FIG. 18 is a block diagram illustrating an example of an information generator.

First, with reference to FIGS. 17 to 19, the configuration and the operation of the transmission-side controller 150 according to the second embodiment will be described. In FIG. 17, the same components as those of the transmission-side controller 150 according to the first embodiment are denoted by the same reference numerals, and the description thereof will be omitted.

As illustrated in FIG. 17, the transmission-side controller 150 according to the second embodiment is different from that according to the first embodiment in that it further includes an information generator 157. As illustrated in FIG. 18, the information generator 157 includes a frequency modulation setter 161, a multi-level degree setter 162, a baud rate setter 163, and an integrator 164.

The first generator 155 outputs the generated second coefficient to the integrator 164. The frequency modulation setter 161 sets, to itself, whether or not to use frequency modulation of the transmission frequency in accordance with the control from the operation terminal 10. The multi-level degree setter 162 sets, to itself, a multi-level degree lower than the multi-level degree used for the main signal in accordance with the control from the operation terminal 10. The baud rate setter 163 sets, to itself, a baud rate lower than the baud rate used for the main signal in accordance with the control from the operation terminal 10. These various settings may be made at the same timing or different timings as the setting of the operation mode number or the setting of the amplification target value.

When the frequency modulation setter 161 is set to use frequency modulation, the integrator 164 generates transmission information in which information on one or both of the fact that frequency modulation is used and the baud rate set in the baud rate setter 163 is integrated with information on the second coefficient. When the frequency modulation setter 161 is set not to use the frequency modulation, the integrator 164 generates the transmission information in which information on one or both of the multi-level degree set in the multi-level degree setter 162 and the baud rate set in the baud rate setter 163 is integrated with information on the second coefficient.

The integrator 164 outputs the generated transmission information to the pre-equalization circuit 113 of the TxDSP 110. Based on the transmission information, the pre-equalization circuit 113 generates an electrical control signal including the transmission information and outputs it to the DAC 120. Thus, a control signal having the setting different from the main signal is transmitted from the optical transmitter 100. Therefore, the optical receiver 200 can identify the control signal and the main signal. In the case of using the frequency modulation, since the frequency modulation is incompatible with the phase modulation such as QPSK (Quadrature Phase Shift Keying), the use of the multi-level degree is avoided.

Figure 19:
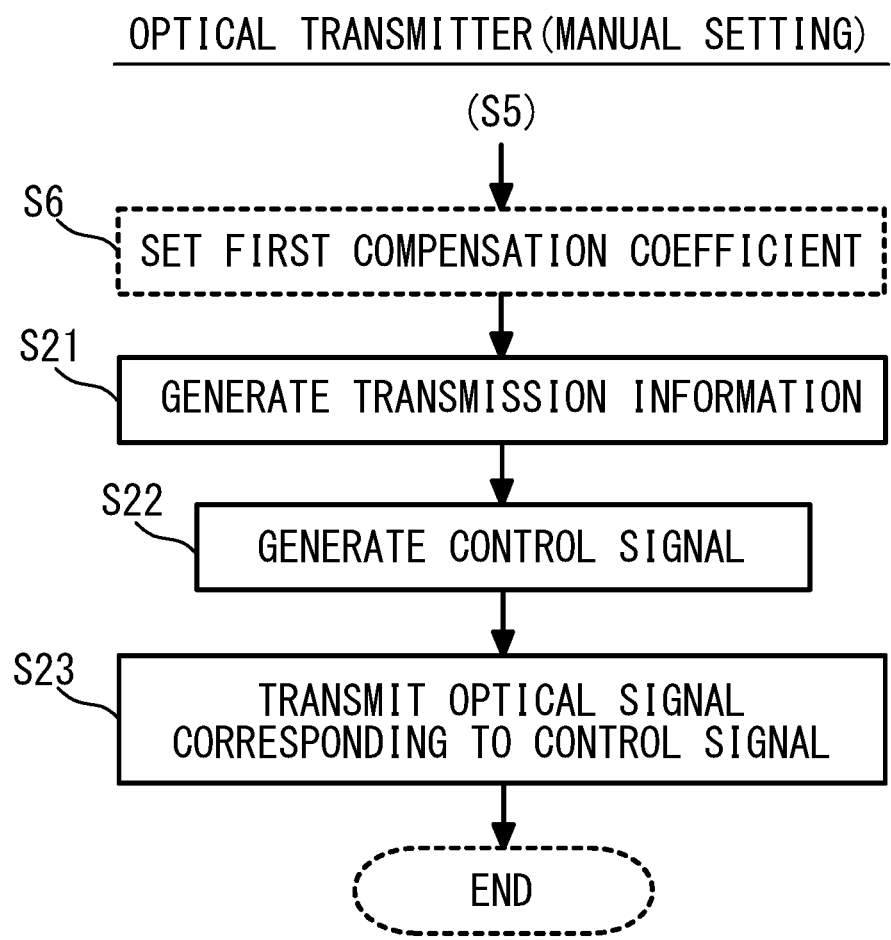
FIG. 19 is a flowchart illustrating an example of the operation of the optical transmitter according to the second embodiment.

As illustrated in FIG. 19, when the first superimposer 156 executes the process of step S6, the information generator 157 generates the transmission information as described above (step S21), and outputs it to the pre-equalization circuit 113. The pre-equalization circuit 113 generates a control signal including the transmission information (step S22), and outputs it to the DAC 120. The CDM 130 converts the control signal output to the DAC 120 into the optical signal corresponding to the control signal, and transmits the optical signal to the optical receiver 200 (step S23). In this way, the optical transmitter 100 transmits the control signal to the optical receiver 200.

Figure 20:
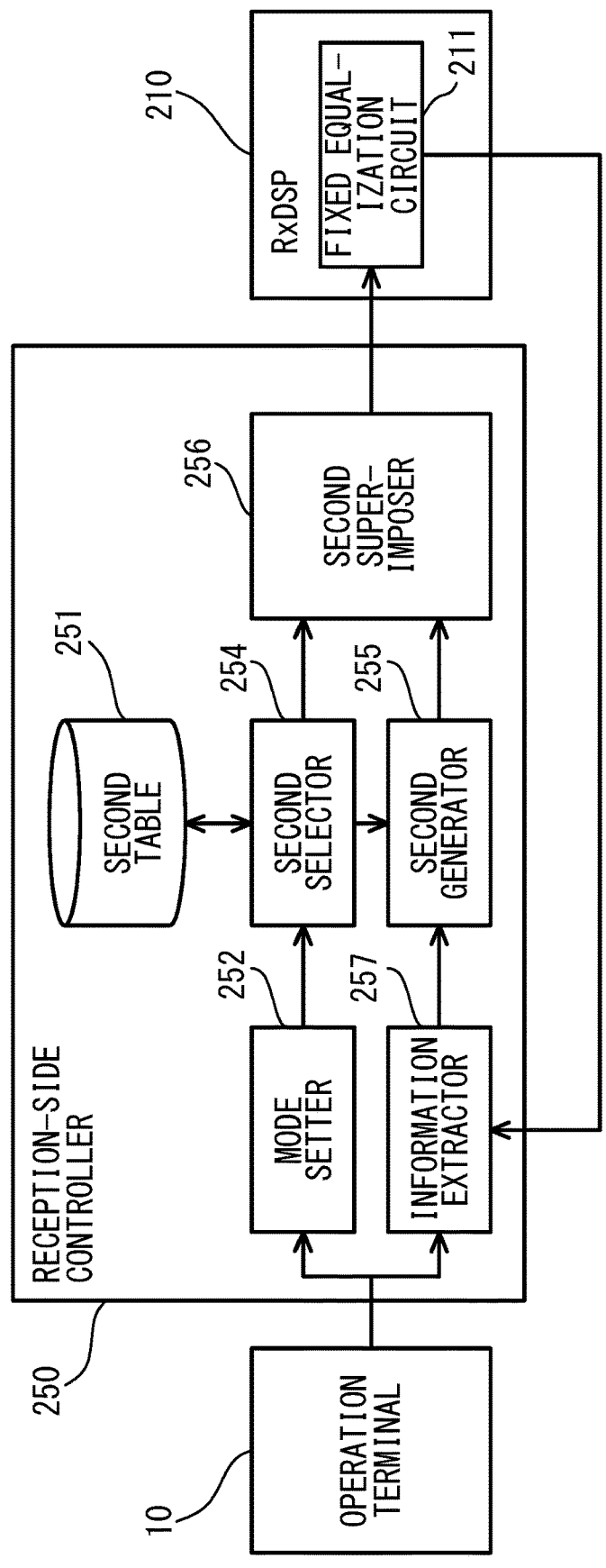
FIG. 20 is a block diagram illustrating an example of a reception-side controller according to the second embodiment.

Next, the configuration and the operation of the reception-side controller 250 according to the second embodiment will be described with reference to FIGS. 20 and 21. In FIG. 20, the same components as those of the reception-side controller 250 according to the first embodiment are denoted by the same reference numerals, and the description thereof is omitted.

The reception-side controller 250 according to the second embodiment differs from that according to the first embodiment in that it further includes an information extractor 257. The information extractor 257 extracts the transmission information after digital demodulation executed by the fixed equalization circuit 211 based on the control signal corresponding to the optical signal received by the optical receiver 200 (specifically, the ICR 230). The information extractor 257 outputs the second coefficient from the extracted transmission information, to the second generator 255. Thus, as in the first embodiment, the second generator 255 can generate the fourth coefficient based on the second coefficient.

Figure 21:
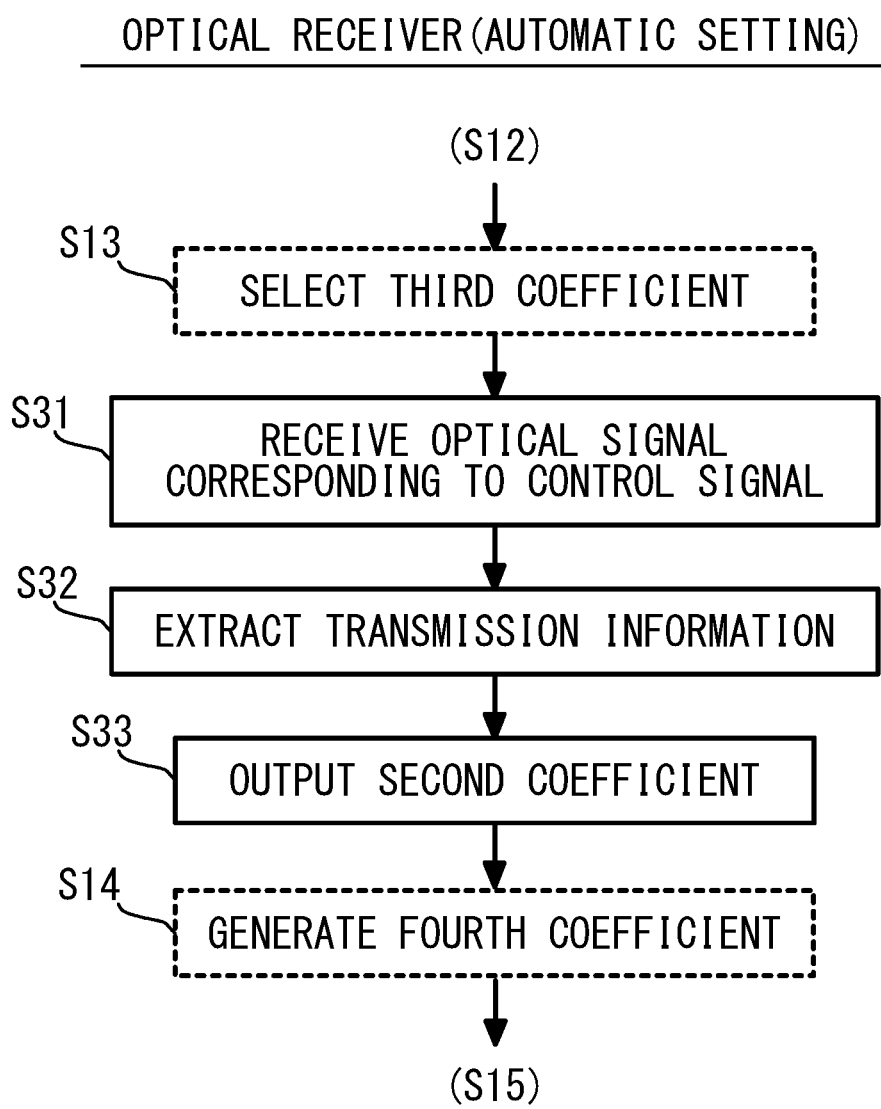
FIG. 21 is a flowchart illustrating an example of the operation of the optical receiver according to the second embodiment.

As illustrated in FIG. 21, when the second selector 254 executes the process of step S13, the ICR 230 receives the optical signal corresponding to the control signal (step S31). When the ICR 230 receives the optical signal, the information extractor 257 extracts the transmission information from the control signal corresponding to the optical signal (step S32), and outputs the second coefficient to the second generator 255 (step S33). Thus, the second generator 255 can execute the processing of step S14.

As described above, according to the second embodiment, the optical receiver 200 can generate the fourth coefficient based on the second coefficient transmitted from the optical transmitter 100 without resetting the second coefficient generated by the optical transmitter 100 to the optical receiver 200. Therefore, it is possible to reduce the setting burden on a person in charge of setting who operates the operation terminal 10. In addition, the processing load can be reduced by omitting the process of setting the second coefficient by the optical receiver 200.

Third Embodiment

Next, a third embodiment of the present invention will be described with reference to FIGS. 22 to 27. In the first embodiment described above, the transmission-side controller 150 generates the second coefficient, and the reception-side controller 250 uses the second coefficient via the operation terminal 10 to generate the fourth coefficient. In the third embodiment, the transmission-side controller 150 does not generate the second coefficient, but instead uses the second coefficient previously associated with the first coefficient by initial setting (for example, at the time of manufacturing the apparatus). Further, the reception-side controller 250 does not generate the fourth coefficient based on the second coefficient, but uses the fourth coefficient previously associated with the third coefficient by initial setting.

Figure 22:
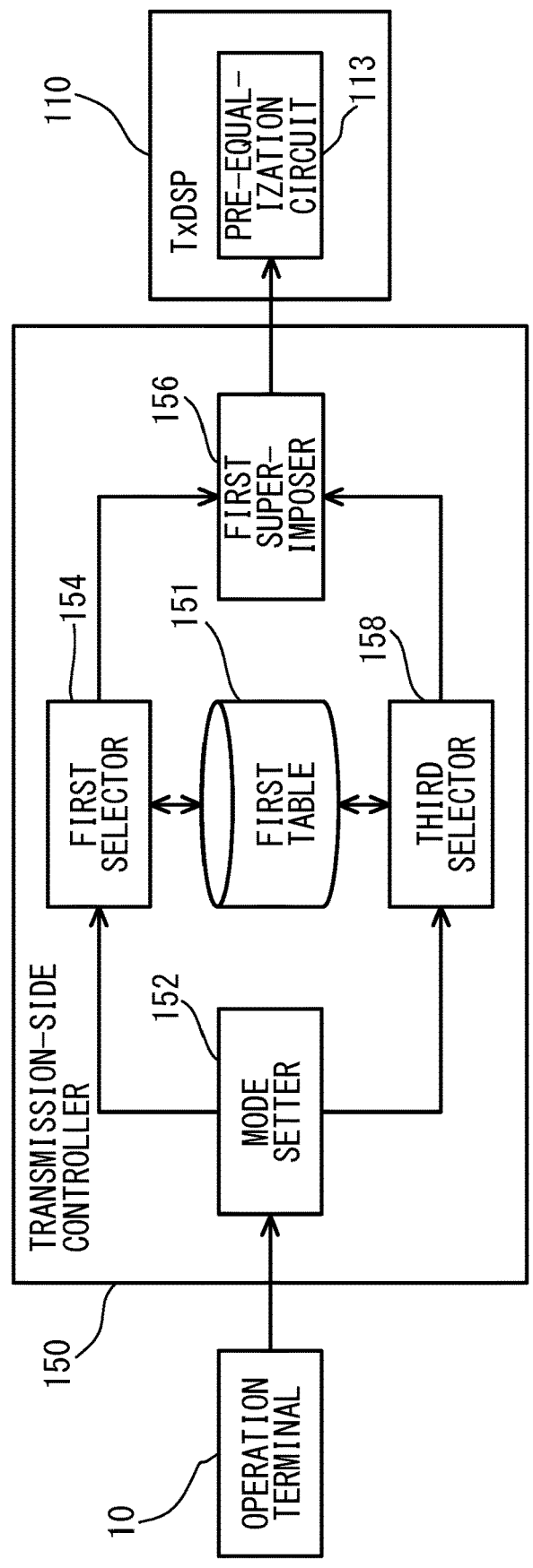
FIG. 22 is a block diagram illustrating an example of a transmission-side controller according to a third embodiment.

First, the configuration and the operation of the transmission-side controller 150 according to the third embodiment will be described with reference to FIGS. 22 to 24. In FIG. 22, the same components as those of the transmission-side controller 150 according to the first embodiment are denoted by the same reference numerals, and the description thereof is omitted.

As illustrated in FIG. 22, the transmission-side controller 150 according to the third embodiment differs from the first embodiment in that it does not include a target setter 153 and the first generator 155, but further includes a third selector 158. As illustrated in FIG. 23, the first table 151 according to the third embodiment is different from that according to the first embodiment in that the second coefficient is associated with the first coefficient. The third selector 158 selects the second coefficient corresponding to the operation mode number set in the mode setter 152 from the first table 151. The third selector 158 outputs the selected second coefficient to the first superimposer 156. Thus, the first superimposer 156 can superimpose the first coefficient output from the first selector 154 and the second coefficient output from the third selector 158. That is, the first superimposer 156 can generate the first compensation coefficient.

Figure 24:
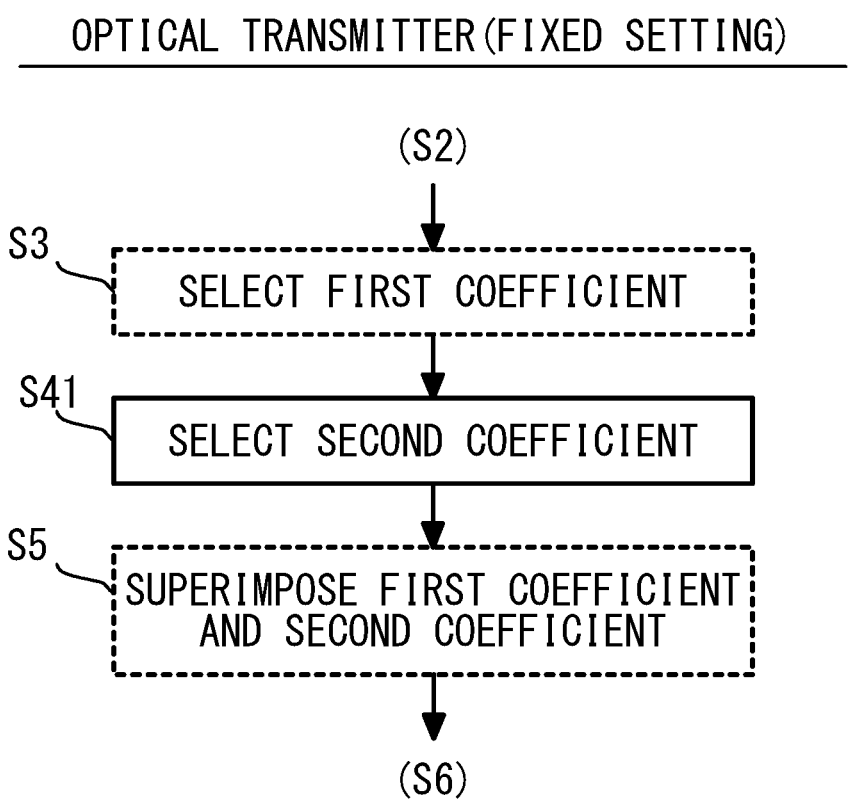
FIG. 24 is a flowchart illustrating an example of the operation of the optical transmitter according to the third embodiment.

As illustrated in FIG. 24, when the first selector 154 executes the process of step S3, the third selector 158 selects the second coefficient as described above (step S41) and outputs it to the first superimposer 156. Thus, the first superimposer 156 can execute the processing of step S5.

Figure 25:
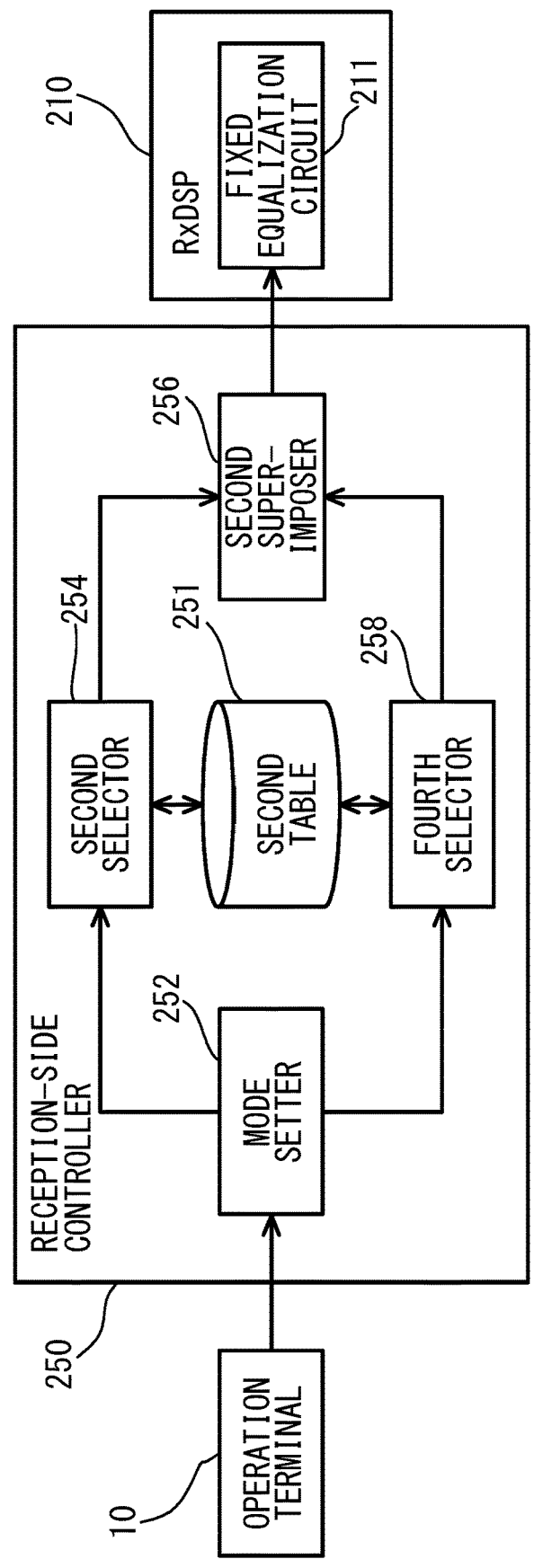
FIG. 25 is a block diagram illustrating an example of a reception-side controller according to the third embodiment.

Next, the configuration and the operation of the reception-side controller 250 according to the third embodiment will be described with reference to FIGS. 25 to 27. In FIG. 25, the same components as those of the reception-side controller 250 according to the first embodiment are denoted by the same reference numerals, and the description thereof is omitted.

As illustrated in FIG. 25, the reception-side controller 250 according to the third embodiment differs from that according to the first embodiment in that it does not include the coefficient setter 253 and the second generator 255, but further includes a fourth selector 258. As illustrated in FIG. 26, the second table 251 according to the third embodiment is different from that according to the first embodiment in that the fourth coefficient is associated with the third coefficient. The fourth selector 258 selects the fourth coefficient corresponding to the operation mode number set in the mode setter 252 from the second table 251. The fourth selector 258 outputs the selected fourth coefficient to the second superimposer 256. Thus, the second superimposer 256 can superimpose the third coefficient output from the second selector 254 and the fourth coefficient output from the fourth selector 258. That is, the second superimposer 256 can generate the second compensation coefficient.

Figure 27:
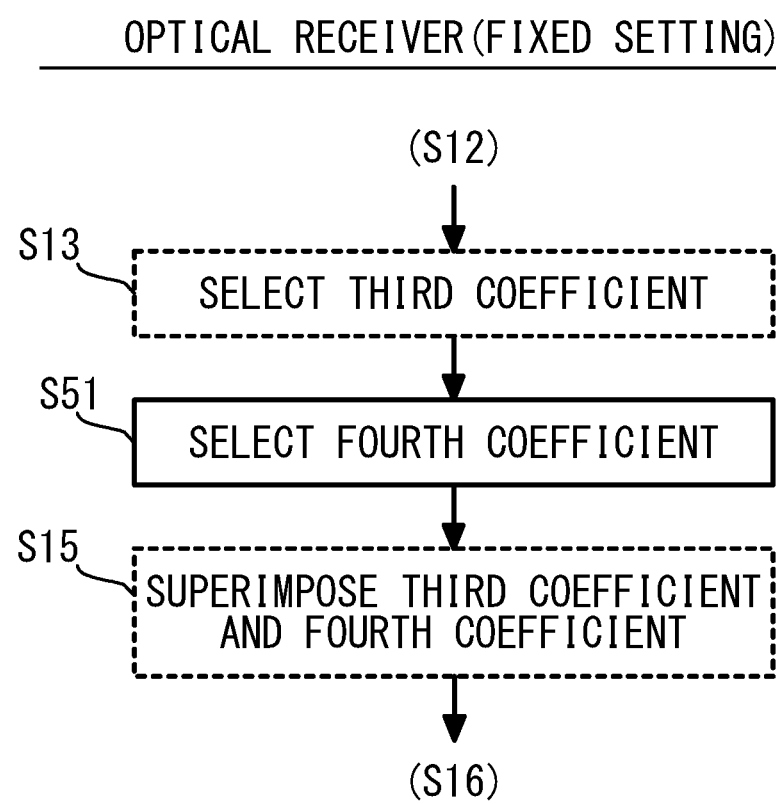
FIG. 27 is a flowchart illustrating an example of operation of the optical receiver according to the third embodiment.

As illustrated in FIG. 27, when the second selector 254 executes the process of step S13, the fourth selector 258 selects the fourth coefficient as described above (step S51), and outputs it to the second superimposer 256. Thus, the second superimposer 256 can execute the process of step S15.

As described above, according to the third embodiment, it is possible to specify the second coefficient in accordance with the operation mode number and superimpose it on the first coefficient without setting the amplification target value for the optical transmitter 100. Further, even if the second coefficient is not set for the optical receiver 200, it is possible to specify the fourth coefficient according to the operation mode number and superimpose it on the third coefficient. Therefore, it is possible to reduce the burden on the person in charge of setting who operates the operation terminal 10. In addition, the processing load can be reduced by omitting the process of setting the amplification target value by the optical transmitter 100 and the process of setting the second coefficient by the optical receiver 200.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical transmission and reception system comprising:
   an optical transmitter that converts an electrical data signal into an optical signal and transmits the optical signal; and
   an optical receiver that receives the optical signal input from the optical transmitter via an optical transmission line and converts the optical signal into the electrical data signal;
   wherein the optical transmitter includes a first compensator that compensates for a loss generated in the optical transmitter based on a first coefficient in which an upward peak of a power of a band is on a higher frequency side in a frequency band of the electrical data signal, and a second coefficient in which the power of the band increases as a frequency becomes lower in a part of the band on a lower frequency side than the peak in the frequency band of the electrical data signal, and
   the optical receiver includes a second compensator that compensates for a loss generated in the optical transmission line based on a third coefficient in which the power of the band decreases as the frequency becomes lower in a part of the band on the lower frequency side than the peak.

2. An optical transmission and reception system comprising:
   an optical transmitter that converts an electrical data signal into an optical signal and transmits the optical signal; and
   an optical receiver that receives the optical signal input from the optical transmitter via an optical transmission line and converts the optical signal into the electrical data signal;
   wherein the optical transmitter includes:
   a first compensator that compensates for a loss generated in the optical transmitter to the electrical data signal based on a first compensation coefficient; and
   a first setter that sets the first compensation coefficient to the first compensator;
   wherein the first setter generates the first compensation coefficient based on a first coefficient for amplifying a power of a band on a higher frequency side in the frequency band of the electrical data signal so that the loss generated in the optical transmitter is compensated, and a second coefficient for amplifying the power of the band on a lower frequency side in the frequency band of the electrical data signal so that a signal quality of the electrical data signal is equal to or more than a predetermined value,
   wherein the optical receiver includes:
   a second compensator that compensates for the loss generated in the optical transmission line to the electrical data signal based on a second compensation coefficient; and
   a second setter that sets the second compensation coefficient to the second compensator;
   wherein the second setter generates the second compensation coefficient based on a third coefficient for amplifying the electrical data signal and a fourth coefficient for amplifying the electrical data signal based on an amplification characteristic opposite to the second coefficient so that a loss generated in the optical transmission line is compensated.

3. The optical transmission and reception system as claimed in claim 2, wherein
the first compensator suppresses the power of the electrical data signal to an upper limit value or less of a converter that converts the electrical data signal in a digital form into the electrical data signal in an analog form.

4. The optical transmission and reception system as claimed in claim 2, wherein
the optical transmitter transmits the second coefficient to the optical receiver, and
the second setter generates the fourth coefficient based on the second coefficient received by the optical receiver.

5. The optical transmission and reception system as claimed in claim 2, wherein
the optical transmitter transmits the second coefficient to the optical receiver using a first signal having a lower baud rate than a baud rate of the electrical data signal.

6. The optical transmission and reception system as claimed in claim 2, wherein
the optical transmitter transmits the second coefficient to the optical receiver using a second signal having a lower multi-level degree than a multi-level degree of the electrical data signal.

7. The optical transmission and reception system as claimed in claim 2, wherein
the optical transmitter transmits the second coefficient to the optical receiver by using a third signal having a modulated transmission frequency.

8. The optical transmission and reception system as claimed in claim 2, wherein
the first setter determines the first coefficient in accordance with at least one of a baud rate and a modulation scheme of the electrical data signal, and
the second setter determines the third coefficient in accordance with at least one of the baud rate and the modulation scheme of the electrical data signal.

9. The optical transmission and reception system as claimed in claim 2, wherein
the first setter determines both the first coefficient and the second coefficient according to at least one of a baud rate and a modulation scheme of the electrical data signal, and
the second setter determines both the third coefficient and the fourth coefficient according to at least one of the baud rate and the modulation scheme of the electrical data signal.

10. An optical transmitter that converts an electrical data signal into an optical signal and transmits the optical signal to an optical receiver that receives the optical signal input via an optical transmission line and converts the optical signal into the electrical data signal, the optical transmitter comprising:
a first compensator that compensates for a loss generated in the optical transmitter to the electrical data signal based on a first compensation coefficient; and
a first setter that sets the first compensation coefficient to the first compensator;
wherein the first setter generates the first compensation coefficient by superimposing a first coefficient for amplifying a power of a band on a higher frequency side in the frequency band of the electrical data signal so that the loss generated in the optical transmitter is compensated, and a second coefficient for amplifying the power of the band on a lower frequency side in the frequency band of the electrical data signal so that a signal quality of the electrical data signal is equal to or more than a predetermined value,
wherein the optical receiver includes:
a second compensator that compensates for the loss generated in the optical transmission line to the electrical data signal based on a second compensation coefficient; and
a second setter that sets the second compensation coefficient to the second compensator;
wherein the second setter generates the second compensation coefficient by superimposing a third coefficient for amplifying the electrical data signal and a fourth coefficient for amplifying the electrical data signal based on an amplification characteristic opposite to the second coefficient so that a loss generated in the optical transmission line is compensated.

11. An optical receiver that receives an optical signal input via an optical transmission line from an optical transmitter and converts the optical signal into an electrical data signal, the optical transmitter converting the electrical data signal into the optical signal and transmitting the optical signal, the optical receiver comprising:
wherein the optical transmitter includes:
a first compensator that compensates for a loss generated in the optical transmitter to the electrical data signal based on a first compensation coefficient; and
a first setter that sets the first compensation coefficient to the first compensator;
wherein the first setter generates the first compensation coefficient based on a first coefficient for amplifying a power of a band on a higher frequency side in the frequency band of the electrical data signal so that the loss generated in the optical transmitter is compensated, and a second coefficient for amplifying the power of the band on a lower frequency side in the frequency band of the electrical data signal so that a signal quality of the electrical data signal is equal to or more than a predetermined value,
wherein the optical receiver includes:
a second compensator that compensates for the loss generated in the optical transmission line to the electrical data signal based on a second compensation coefficient; and
a second setter that sets the second compensation coefficient to the second compensator;
wherein the second setter generates the second compensation coefficient based on a third coefficient for amplifying the electrical data signal and a fourth coefficient for amplifying the electrical data signal based on an amplification characteristic opposite to the second coefficient so that a loss generated in the optical transmission line is compensated.

* * * * *